United States Patent
Cooper

(10) Patent No.: US 9,528,198 B2
(45) Date of Patent: Dec. 27, 2016

(54) METHODS OF MAKING NANOFIBER YARNS AND THREADS

(71) Applicant: APOLLO RESOURCE CORPORATION, INC., Phoenix, AZ (US)

(72) Inventor: William Cooper, Sante Fe, NM (US)

(73) Assignee: The Carbon Cable Company, LLC, Scottsdale, AZ (US)

(*) Notice: Subject to any disclaimer, the term of this patent is extended or adjusted under 35 U.S.C. 154(b) by 365 days.

(21) Appl. No.: 14/210,963

(22) Filed: Mar. 14, 2014

(65) Prior Publication Data

US 2015/0167205 A1 Jun. 18, 2015

Related U.S. Application Data

(60) Provisional application No. 61/785,183, filed on Mar. 14, 2013.

(51) Int. Cl.
| | | |
|---|---|---|
| *D02G 3/16* | (2006.01) | |
| *D02G 3/02* | (2006.01) | |
| *D02G 3/36* | (2006.01) | |
| *C01B 31/02* | (2006.01) | |
| *D01D 5/06* | (2006.01) | |

(52) U.S. Cl.
CPC .............. *D02G 3/16* (2013.01); *C01B 31/0293* (2013.01); *D01D 5/06* (2013.01); *D02G 3/02* (2013.01); *D02G 3/36* (2013.01); *D06M 2200/40* (2013.01); *D10B 2101/122* (2013.01)

(58) Field of Classification Search
CPC .............. D02G 3/02; D02G 3/16; D02G 3/36; C01B 31/0293
See application file for complete search history.

(56) References Cited

U.S. PATENT DOCUMENTS

| | | | |
|---|---|---|---|
| 4,663,230 A | 5/1987 | Tennent | |
| 2007/0036709 A1* | 2/2007 | Lashmore | B82Y 30/00 423/447.1 |

(Continued)

FOREIGN PATENT DOCUMENTS

| | | |
|---|---|---|
| WO | 2007/015710 A3 | 2/2007 |
| WO | 2008/022129 A2 | 2/2008 |

OTHER PUBLICATIONS

Ghemes, et al., "Fabrication and mechanical properties of carbon nanotube yarns spun from ultra-long multi-walled carbon nanotube arrays", Carbon, vol. 50, No. 12, pp. 4579-4587, (May 19, 2012).

(Continued)

*Primary Examiner* — Shaun R Hurley
(74) *Attorney, Agent, or Firm* — Knobbe Martens Olson & Bear LLP

(57) ABSTRACT

There is disclosed a method of making a material comprising an assembly of at least one spun yarn, comprising: synthetic inorganic fibers, such as carbon, metal, oxides, carbides or alloys or combinations thereof, wherein a majority of the fibers: (a) are longer than 300 μm, (b) have a diameter ranging from 0.25 nm and 700 nm, and (c) are substantially crystalline, wherein the yarn has substantial flexibility and uniformity in diameter. In one embodiment, the method comprises spinning yarn by pulling fibers from a bulk material with at least one spinner that has real time feedback controls.

17 Claims, 20 Drawing Sheets

(56) References Cited

U.S. PATENT DOCUMENTS

| | | | |
|---|---|---|---|
| 2008/0170982 A1* | 7/2008 | Zhang | B82Y 10/00 423/447.3 |
| 2009/0223826 A1 | 9/2009 | Kim et al. | |
| 2009/0282802 A1 | 11/2009 | Cooper et al. | |

OTHER PUBLICATIONS

Miao, et al., "Yarn spun from carbon nanotube forests: Production, structure, properties and applications", Particuology, vol. 11, No. 4, pp. 378-393, (Feb. 28, 2013).

Baker, et al., "Formation of Carbonaceous Deposits from the Platinum-Iron Catalyzed Decomposition of Acetylene", Journal of Catalysis, vol. 37, pp. 101-105, (1975).

Foster, et al., "The Growth and Characterization of Potassium and Rubidium Azide Single Crystals", Journal of Crystal Growth, vol. 32, pp. 33-36, (1976).

Baker, et al., "The Formation of Filamentous Carbon", Chemistry and Physics of Carbon, vol. 14, pp. 81-165, (1978).

Singh, et al., "Novel Two-Step Method for Synthesis of High-Density Nanocrystalline Diamond Fibers", American Chemical Society, Chem. Mater., pp. 1725-1732, (2008).

Dalton, et al, "Continuous carbon nanotube composite fibers: properties, potential applications, and problems", The Royal Society of Chemistry, J. Mater. Chem., vol. 14, pp. 1-3, (2004).

Zhong, et al., "Continuous Multilayered Carbon Nanotube Yarns", Advanced Materials, vol. 22, issue 6, pp. 692-696, (Feb. 9, 2010).

Liu, et al., "Carbon nanotube yarns with high tensile strength made by a twisting and shrinking method", Nanotechnology 21, 045708, pp. 1-7, (2010).

Tran, et al., "Manufacturing polymer/carbon nanotube composite using a novel direct process", Nanotechnology 22, 145302, pp. 1-9, (2011).

Zheng, et al., "Carbon-Nanotube Cotton for Large-Scale Fibers", Advanced Materials, vol. 19, issue 18, pp. 2567-2570, (2007).

Dresselhaus, et al., "Carbon Nanotubes Synthesis, Structure, Properties, and Applications", Topics in Applied Physics, Springer, pp. 1-6, (2000).

Collins, et al., "Nanotubes for Electronics", Scientific American, pp. 62-70, (Dec. 2000).

International Search Report and the Written Opinion of the International Searching Authority from the European Patent Office in International No. PCT/US2014/027405 mailed Jul. 4, 2014.

* cited by examiner

ALIGNED CARBON NANOTUBE FOREST → ROLLING BY A ROLLER → THIN FILM WITH ALIGNED CARBON NANOTUBES

ALIGNED CNT RIBBONS    CNT YARN

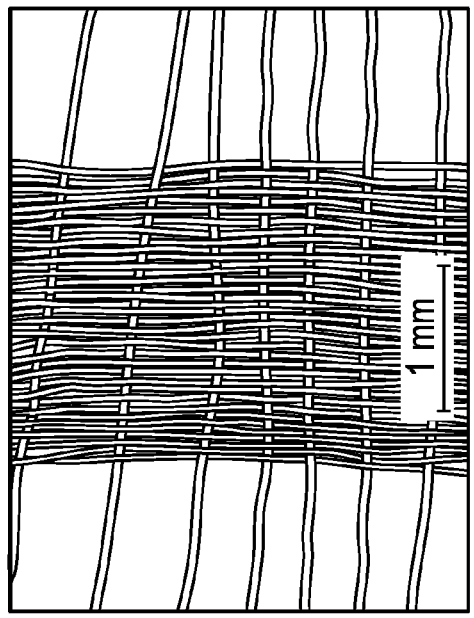
FIG. 10
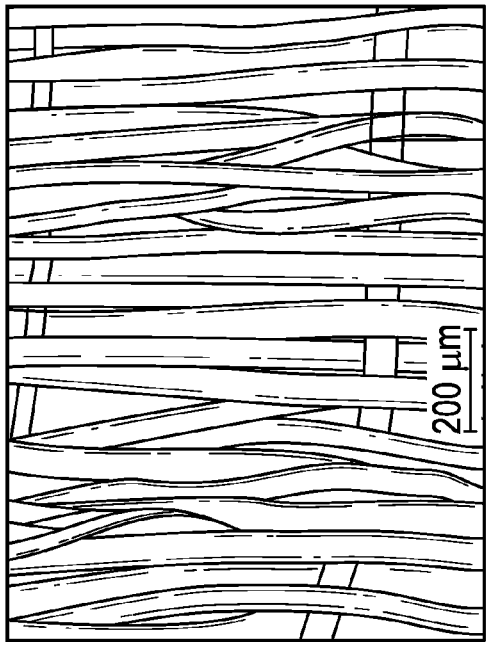
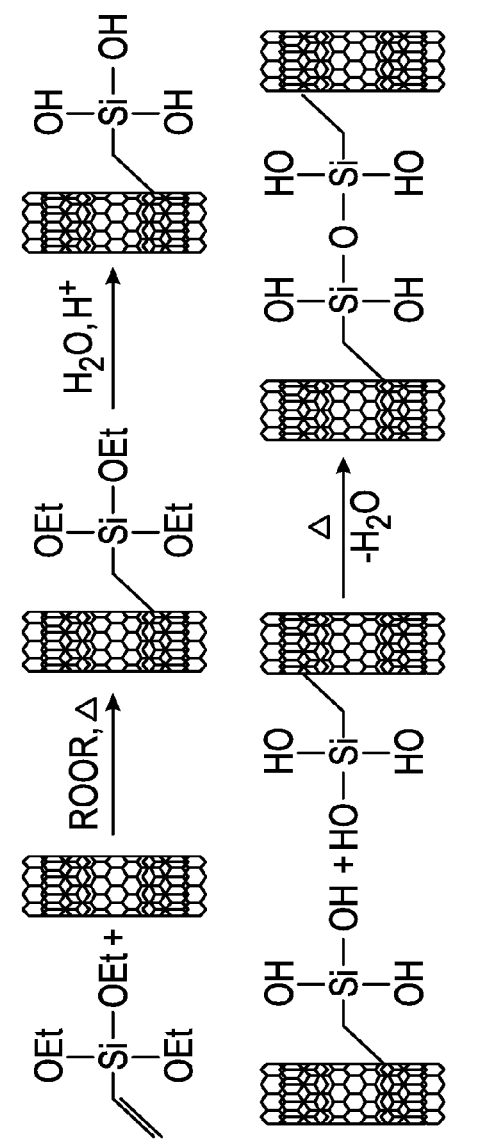
FIG. 11

METHODS OF MAKING NANOFIBER YARNS AND THREADS

This application claims the benefit of domestic priority to U.S. Provisional Patent Application No. 61/785,183, filed Mar. 14, 2013, which is herein incorporated by reference in its entirety.

The present disclosure relates to methods of making a material comprised of small diameter inorganic fibers spun into yarns, threads cables and ropes. Materials made by such methods as well as composites are also disclosed.

Metals and plastics and natural materials have long been favorites for many technical applications because of their versatile physical and chemical properties including malleability, strength, durability, and/or corrosion resistance. However, for an increasing number of applications, ultralight materials exhibiting comparable or higher strength, durability and for conductivity are needed. To date, the need for these materials has been primarily limited to high-tech applications, such as high performance aerospace and high-end electronics. However, they are becoming increasingly needed in other areas as well, such as ballistic mitigation applications (e.g. micro-meteorite protection for satellites and space vehicles), and a wide range of commercial applications involving heat sinks, air conditioning units, computers, casings, and vehicle bodies, unmanned aerial vehicles, lightweight energy efficient telecommunications equipment, robotics, and high end filtration, purification, separation devices, to name a few.

Recent advances in materials science and nanotechnology have led to the creation of a new class of micro and nano scale fibers with conductivity, optical mechanical, surface area, and quantum properties never seen before. Silicon Nano-fibers, Diamond fibers, colossal carbon tubes, multi-wall gas phase carbon nanotubes, multiwall arrayed carbon nanotube, single walled carbon nanotubes and their unique properties have been known for some time, Examples of literature disclosing an inorganic nano-fiber, carbon nanotubes including J. Catalysis, 37, 101 (1975); Journal of Crystal Growth 32, 35 (1976); "Formation of Filamentous Carbon', Chemistry of Physics of Carbon, ed. Philip L. Waker, Jr. and Peter Thrower, Vol. 14, Marcel Dekker, Inc., New York and Base 1, 1978; and U.S. Pat. No. 4,663,230, issued Dec. 6, 1984. Also included by reference "Novel Two-Step Method for Synthesis of High-Density Nanocrystalline Diamond Fibers" Chem. Matter., 2008, 20(5), pp 1725-1732.

However, recent interest in carbon filamentary material was stimulated by a paper by Iijima (1991) which made producing these inorganic materials possible. These early studies and the work that has developed from them has resulted in the discovery of a class of nano-fiber material with remarkable mechanical, electrical and thermal properties that can be produced on the industrial scale.

Nano-fiber spinning has been accomplished through solution phase chemistry (acid, sol-gel etc.), nano-fiber spinning of random orientation from a CVD furnace, and dry spinning of a stationary nano-fiber forest array, Included by reference: "Continuous carbon nanotube composite fibers: properties, potential applications, and problems" J. Mater. Chem. 2004, 14, 1-3.

The bulk of the commercial effort for producing nano-fiber yarns use solution based chemistry that requires relatively short nano-fibers (<100 um). In addition these nano-fibers were grown from a random catalyst support or from a gas phase fluidized bed. These synthetic methods not only produce relatively short nano-fibers, they produce fibers that have significant curvature due to lattes dislocations within the nano-fiber structure.

All of the nano-fiber nanotube yarns produced to date using the techniques discussed above, have limitations. Solution based methods have not yet been made to work with nano-fibers longer than approximately 100 μm most likely due to uncontrolled entanglement.

Nano-fiber spinning and production of yarns directly from the synthesis chemical vapor deposition furnace has significant limitations. The nano-fibers are themselves randomly oriented, have significant curvature, and contain significant quantities of metallic catalyst adsorbed and imbedded in the nano-fibers. Furthermore the cost of the material is significant thus making real commercialization unlikely. Included by reference: "Continuous Multilayered Carbon Nanotube Yarns" in Advanced Materials Vol. 22, Issue 6, 692-696, Feb. 9, 2010.

Thus far the best yarns that can be made are from long nano-fibers 500 um or longer and are dry spun from a forest. Significant efforts have been undertaken to produce scalable and commercial methods for dry spinning of spun yarns from multi-millimeter multi-walled carbon nanotube forests. It is well known and accepted by the nano-fiber yarn and composites community, that this method has the potential to make yarns with bulk strength in the 60 GPa range. Others have published results of dry spinning with short (235 um tall) forests yielding further evidence as to the challenge of spinning yarn from long nano-fiber forests. Included by reference: "Carbon nanotube yarns with high tensile strength made by a twisting and shrinking method" Nanotechnology 21 (2010) 045708.

Yet, others must use polymers to direct spin nano-fibers into a stable and strong nano-fiber yarn. Included by reference: "Manufacturing polymer/carbon nanotube composite using a novel direct process" Nanotechnology, Vol. 22, Nov. 14, 2011.

The principle reason for the near impossibility of direct spinning of an ultra-long nano-fiber forest is the fact nano-fibers in this form are very inconsistent. It has been speculated that spinning will never produce quantities of quality yarns due to the fact that all forest type nano-fibers have significant inconsistencies internal to the forest structure. Zhu reports the routine spinning of yarns 10 cm long in "Carbon-Nanotube Cotton for Large-Scale Fibers" in Advanced Materials Vol. 19, Issue 18, 2567-2570 September, 2007.

Furthermore many authors including the present one have taught functionalization and bonding between nano-fibers, including U.S. Patent Application No. 2009/0282802 A1, which is herein incorporated by reference in its entirety. Bonding between short fibers in a spun yarn will be weaker less conductive yarn than a substantially uniform yarn made from substantially longer nano-fiber containing chemical bonding. The present disclosure teaches one skilled in the art methods for making continues quality spun yarns from ultra-long nano-fibers, and articles made therefrom.

SUMMARY OF THE INVENTION

The present disclosure teaches a novel method for direct spinning of ultra-long nano-fiber forest by using feedback control in the spinning process. Thus, through feedback control tens of kilometers of high quality nano-fiber yarn have been produced without the use of polymers, or spinning agents.

In one embodiment, there is disclosed a method of making a material comprising an assembly of at least one spun yarn, comprising: synthetic inorganic fibers, such as carbon, metal, oxides carbides or alloys or combinations thereof, wherein a majority of the fibers: (a) are longer than 300 μm, (b) have a diameter ranging from 0.25 nm and 700 nm, and (c) are substantially crystalline, wherein the yarn has substantial flexibility and uniformity in diameter.

In one embodiment, the method comprises spinning yarn by pulling fibers from a bulk material with at least one spinner that has real time feedback controls.

The accompanying Figures, which are incorporated in and constitute a part of this specification, illustrate several exemplary embodiments of the disclosure and, together with the description, serve to explain the principles of the disclosure.

BRIEF DESCRIPTION OF THE DRAWINGS

FIG. 2(A) shows a carbon nanotube forest being spun while the yarn is drawn, and FIG. 2(B) shows how the aligned carbon nanotube forest is kept stationary while the yarn is being drawn and twisted.

FIG. 10. illustrates carbon nanotube-based fabric made from one ply threads (left) and two ply threads (right).

FIG. 11. Chemical reactions involved in the carbon nanotube cross-linking through functionalization witty vinyl-triethoxysilane.

Each tension arm can be mounted with an upper limit of approximately 3 kg to deliver substantial pressure between the cabled elements.

Figure 29:
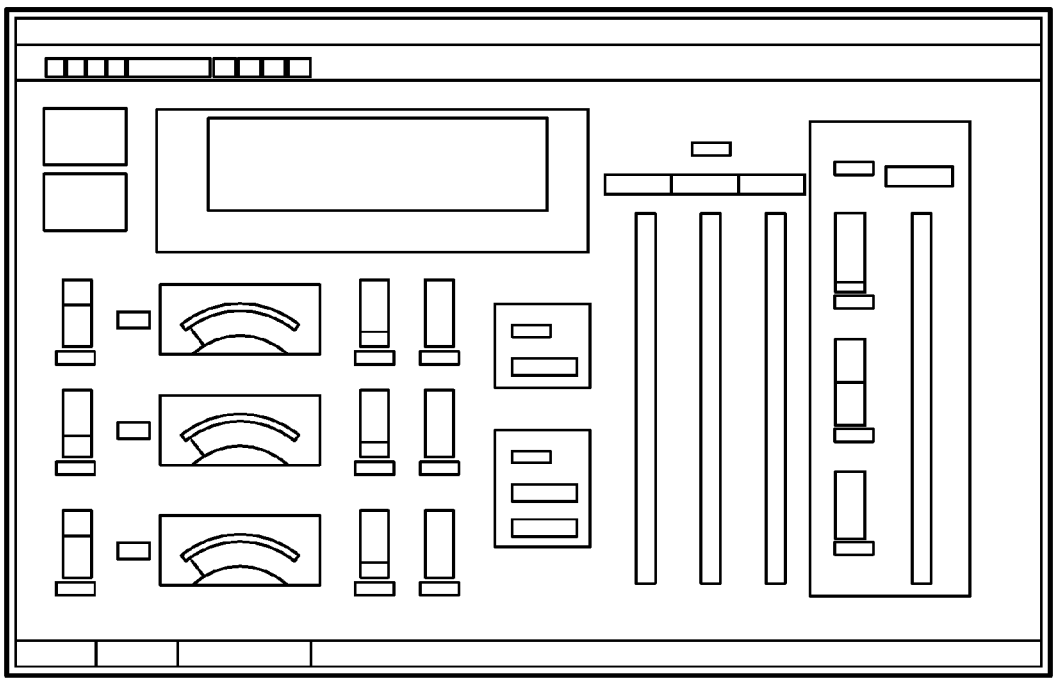

FIG. 29. illustrates the cabling controller dash board. From this dash board cabling parameters can be controlled.

Figure 30:
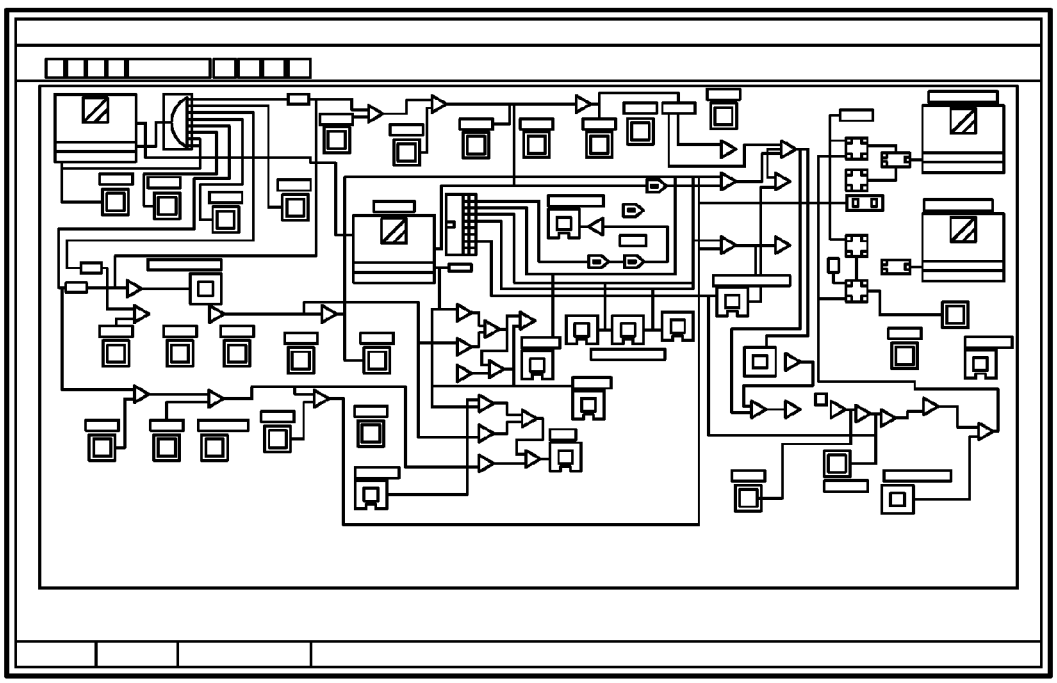

FIG. 30. illustrates the controller program in National Instruments LabView visual programming language for the cabling machine.

Figure 31:
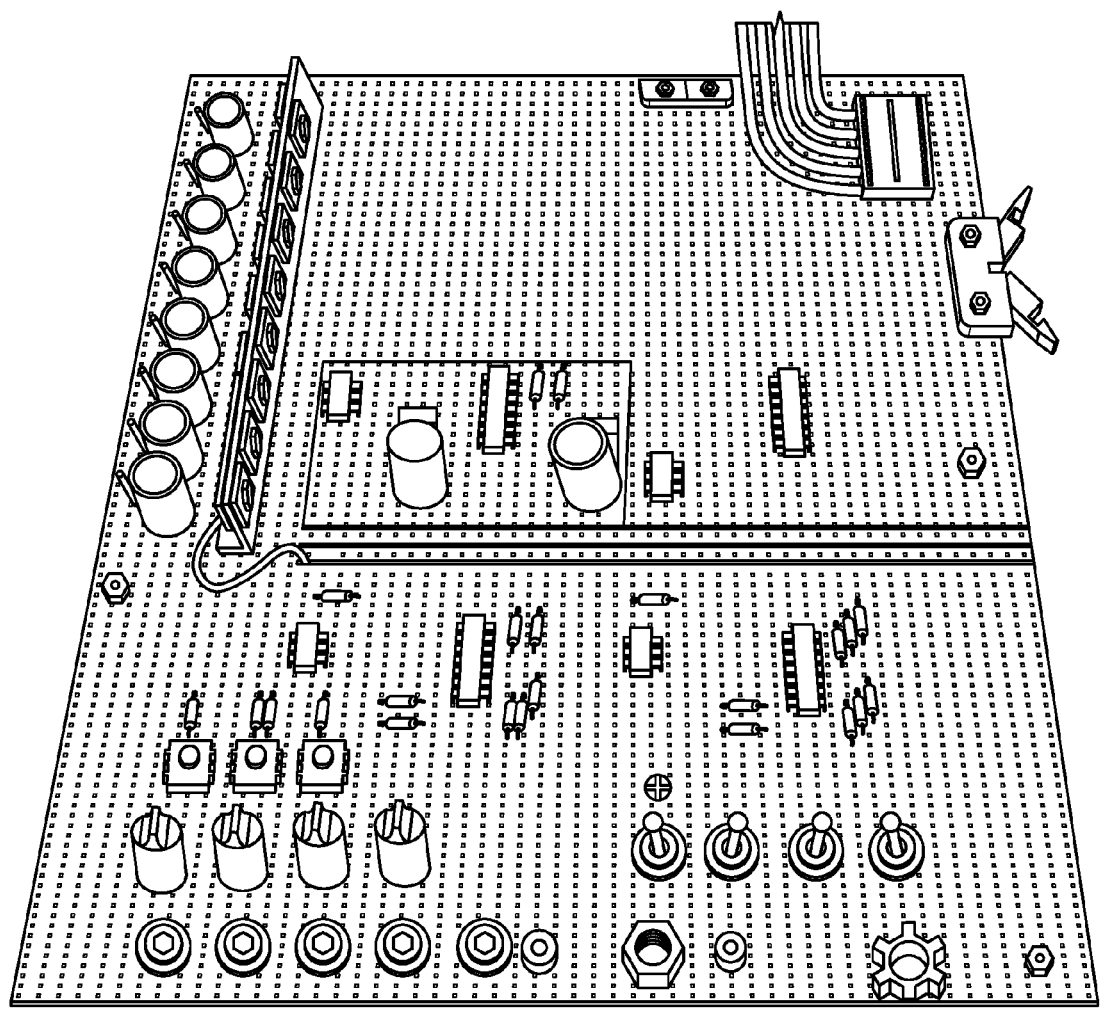

FIG. 31. is the electronics layer for the cabling machine. Every motor requires a power transistor to amplify the control signal coming back from the computer to power the motors as can be seen on the upper left-hand side of this Figure. Furthermore capacitors were used to substantially reduce noise from the motors so as to not adversely affect the circuit.

DEFINITIONS

The term "substantially crystalline" refers to a fiber where the materials comprising the fiber contain a repeating unit cell such that there exists substantially global symmetry around the major axis. The major axis could exist in free space such as a major axis of a fiber in a spiral configuration. Geometric shapes of fibers: tubes, cylinders, ribbons, spiraled tubes, cylinders, ribbons. A counter example would be a carbon nanotube with random defects in the crystalline structure causing random curvature, and random shape. Such a "fiber" does not meet the requirement for substantial symmetry along at least one axis. The utilization of resonate spectroscopy of a nano-scale structure will have substantial resonate peeks if substantial symmetry along at least one axis exists.

The term "carbon nanotubes" or "CNTs" are defined herein as crystalline structures comprised of one or many closed concentric, locally cylindrical, graphene layers. Their structure and many of their properties are described in detail in Carbon Nanotubes: Synthesis, Structure, Properties, and Applications, Topics in Applied Physics. (Vol. 80. 2000 Springer-Verlag, M. S. Dresselhaus, G. Dresselhaus, and P. Avouris, eds.) which is herein incorporated by reference. Carbon nanotubes have demonstrated very high mechanical strengths and stiffness (Collins and Avouris, 2000, "Nanotubes for Electronics". Scientific American: 67, 68, and 69.) They also have very high electrical conductivity which allow current densities of more than 1,000 times that in metals (such as silver and copper). These properties including the high specific strength and stiffness, will be beneficial to the materials disclosed herein.

The term "yarn" is defined as a bundle of filaments approximately spirally arranged to form a very-high aspect ratio, approximately cylindrical structure. The filaments within the yarn are substantially parallel, in a local sense, to neighboring filaments.

The phrase "carbon nanotube yarn" is a yarn composed of a plurality of carbon nanotubes.

The terms "thread" and "rope" are defined as high aspect ratio, approximately cylindrical structures composed of more than one strand of yarn. The term "rope" is defined as a high aspect ratio approximately cylindrical structure composed of one yarn or thread surrounded by additional carbon nanotubes forming the mantle or outer sheath.

The phrase "substantial flexibility" (or variations thereof) in the article (e.g., fiber, thread, rope, yarn) means that the article does not experience significant, if any work hardening. An example of a natural (i e., prior art) material that has substantial flexibility is silk.

The phrase "substantially uniformity in number of nano-fibers" means that when various cross sections of a length material comprising the nano fibers is analyzed, there are substantially the same number of nano-fibers along the entirety of the length, such as within 10% or even 5%.

Figure 14:
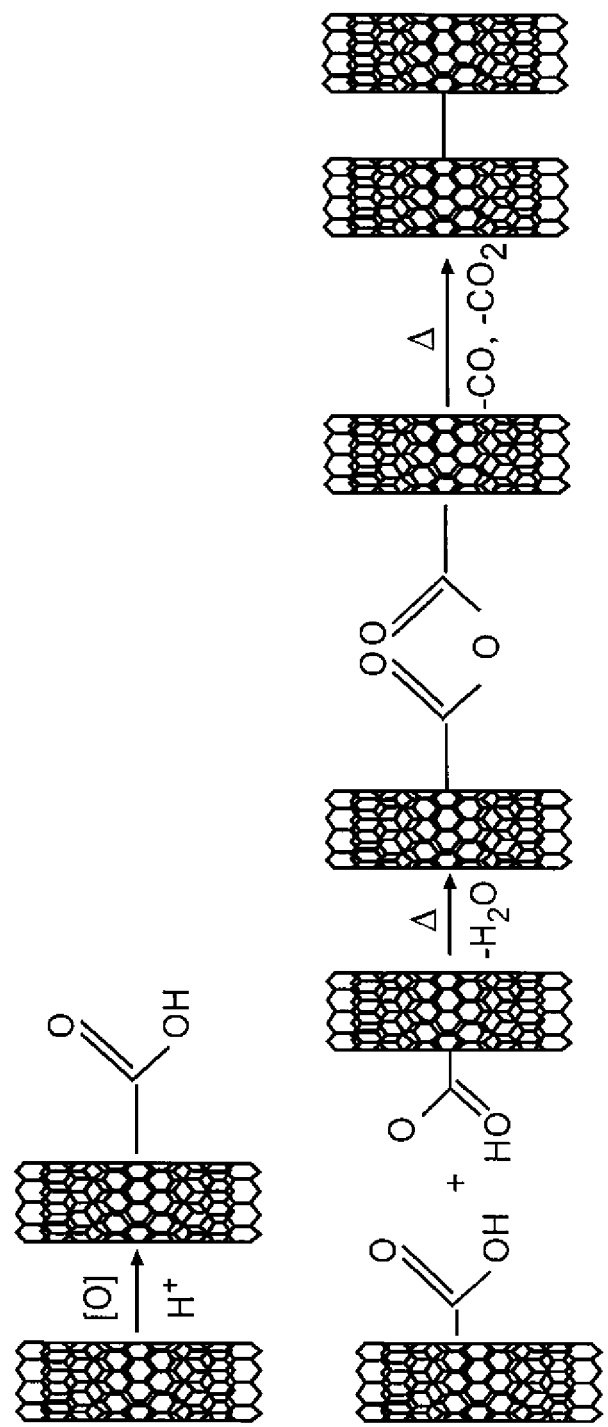
FIG. 14. Chemical reactions involved in the carbon nanotube carboxylation followed by thermal cross-linking.

Other than the techniques mentioned above, post treatment of the disclosed materials could be achieved via high temperature thermal annealing, passing high electric current through the disclosed materials, electron beam and/or ion radiation (chemical reactions involved in these process are shown in FIG. 14), Further improvement of the thermal annealing method could be attempted by introducing additional source of carbon into the thread prior the annealing.

Figure 15:
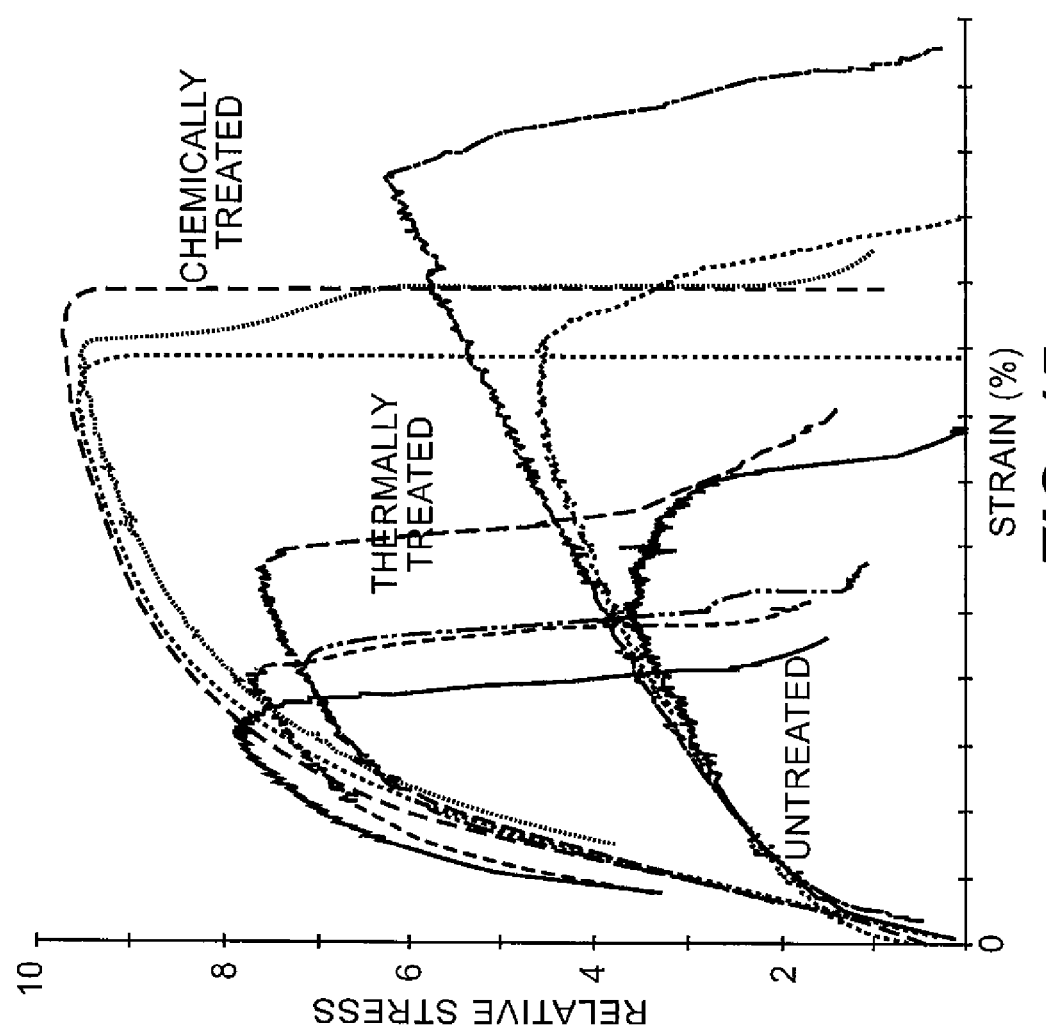
FIG. 15. Stress-strain curves for carbon nanotube strips showing the relative mechanical behavior of the three types of media.

Two of the above mentioned cross-linking approaches were employed in Example 5 and mechanical testing results from three types of materials are shown in FIG. 15. Clearly, mechanical performance of the materials could be enhanced as expected by the used chemical-linking approaches between carbon nanotubes.

In one embodiment, there is disclosed a material comprising an assembly of at least one spun yarn, comprising: synthetic inorganic fibers, such as carbon, metal, oxides, carbides or alloys or combinations thereof wherein a majority of the fibers: (a) are longer than 300 μm, (b) have a diameter ranging from 0.25 nm and 700 nm, and (c) are substantially crystalline, wherein the yarn has substantial flexibility and uniformity in size and shape, such as in diameter.

In one embodiment, the yarn further comprises a sizing agents chosen from poly-aromatic-hydrocarbons, nanoscale graphene structures, starches, polyvinyl alcohols carboxymethylcellulose, acrylates, waxes, dioctyl phthalate, surfactants, alcohols, oils or any combination thereof.

In one embodiment, the yarn used according to the present disclosure may be comprised of more than one species of fibers. In addition or alternatively, the yarn may be infiltrated with a polymer.

In another embodiment, the yarn further comprises molecular components chosen from metallic clusters, metallic coatings, organic functional groups, proteins, peptides, graphene, DNA, polymers and any combination thereof.

It is to be appreciated that the fiber disclosed herein may be substantially hollow, substantially solid, filled with a secondary material, or any combination thereof.

The fiber may be chosen from a variety of materials, such as meta-materials, magnetic materials, semi-conducting materials, conductive materials, doped materials, superconductive materials, adsorptive materials, insulation materials, or any combination thereof.

The disclosed fibers may comprise carbon-based material, such as graphene or exfoliated graphite. In one embodiment, the exfoliated graphite is in the form of nano-platelets, which are less than 50 nanometers thick, such as between 1 and 25 nanometers thick, or even within a range of 1 to 15 nanometers thick, with diameters ranging from sub-micrometer to 100 micrometers. The platelet shape associated with these exfoliated graphite embodiments, provide multiple edges that enable them to be readily modified chemically for enhanced end-use properties, or for improved processing properties such as improved dispersion in polymers.

In various embodiments, the material comprises a thread, rope, woven two dimensional fabric, woven three dimensional article, a three dimensional printed article or any combination thereof. For example, the yarn comprises a long axis, and the fibers within the spun yarn may be substantially aligned and twisted about said long axis. The yarn may have a diameter ranging from 10 nm to 5 mm and be sufficiently conductive at frequency ranges from $1\times10^{-6}$ Hz to $3\times10^{19}$ Hz.

In one embodiment, the material comprises two or more spun yarns twisted together to form a twisted pair. In another embodiment, the twisted pair is twisted while under a tension resulting in a pressure between the twisted pair ranging from 1 mPa and 30 TPa. The inventors have discovered that when tension is translated into an internal pressure with force vectors pointed inward to the global axis of the twisted pair the integrity of the twisted pair can be enhanced.

In another embodiment, the twisted pair may be twisted together with at least one other twisted pair to form a cable to form a cable has a strength of ranging from 10 kPa to 300 GPa.

In one embodiment, there is disclosed a method for the fabrication of material comprising an assembly of at least one spun yarn, the method comprising forming a yarn by spinning synthetic inorganic fibers from a bulk material wherein the said spinning is under feedback control based on a feedback signal, wherein the said spindle containing the nano-fibers is spinning relative to a take-up spindle at a relative angular velocity of between 30 rpm and 500,000 rpm, wherein the said angular velocity is in the axial direction of the as spun yarn, wherein the said nano-fibers are substantially aligned prior to spinning, wherein a majority of the fibers: (a) are longer than 300 μm, (b) have a diameter ranging from 0.25 nm and 700 nm, and (c) are substantially crystalline, to produce a yarn that has substantial flexibility and uniformity in diameter.

In one embodiment, uniformity in diameter is accomplished through feedback control of the spinning parameters comprising but not limited to spindle speed, yarn take-up speed applied capacitive forces, applied magnetic forces, atmospheric conditions, concentration of spinning agent, sliver thickness, sliver alignment, sliver density, spindle fiber federate, roving, dispersion, carding, or any combination thereof, wherein a feedback signal is comprised of automated measurements comprising but not limited to conductivity, resistance, capacitance, inductance, optical, tension, vibrational frequencies, gamma-ray backscatter, x-ray backscatter or any combination thereof.

In one embodiment, the method may further comprise adding (or attaching) at least one molecular component to the synthetic inorganic fibers chosen from but not limited to metallic clusters, nano-fibers, carbon nanotubes metallic coatings, organic functional groups, proteins, peptides, graphene, DNA, polymers and any combination thereof.

In one embodiment, the method of adding at least one molecular component is accomplished by exposing the fibers to physical vapor deposition, chemical vapor deposition, solution phase adsorption, supercritical $CO_2$, plasma deposition, ion implantation, or any combination thereof.

In one embodiment, the additives are applied to the fiber with feedback control of the application parameters comprising but not limited to voltage, temperature, pressure, concentration, composition, frequency, current, or any combination thereof, wherein a feedback signal is comprised of automated measurements comprising but not limited to chemical affinity, conductivity, resistance, capacitance, inductance, optical, tension, vibrational frequencies, gamma-ray backscatter, x-ray backscatter or any combination thereof.

In one embodiment, yarns threads or cables are further cabled together. The cabling is accomplished with spooling and spin tightening the said at least one yarn, contacting the said spun tightened yarn with a tension controller, contacting the said spun tightened yarn with another spun tightened yarn, and take-up of the said cabled multiply yarn.

The above mentioned yarns, threads or ropes made with carbon nanotubes having differing characteristics can be woven together to create unique materials that take advantage of the incredibly diverse properties of the carbon nanotube. For example, depending on the application, carbon nanotubes that exhibit unique electrical, thermal, electromagnetic, strength, and filtration/detection properties can be combined in a yarn to be woven into a multifunctional material.

The invention will be further clarified by the following non-limiting examples, which is intended to be purely exemplary of the invention.

EXAMPLES

Example 1

Carbon Nanotube Yarn and Thread from Dry Process

Raw carbon nanotubes were provided by NanoTech Labs (Yadkinville, N.C. 27055) in clusters typically measuring 3 to 5 mm thickness, 1-2 cm long and 1-2 cm wide. They were used for carbon nanotube yarns making with individual carbon nanotube measuring 3-5 mm in length. Yarns according to this example were made by: a) continuously and sequentially pulling carbon nanotubes from the as-received carbon nanotube clusters; b) twisting the carbon nanotube fibers to make the yarn; c) winding the resulting yarn on to the collecting spool; d) carboxyl functionalization of the spool of yarn; e) heat treating at 500° C. for 30 min to achieve cross-linking within the yarn. The twisting and collection was performed automatically to achieve uniformity.

Figure 1:
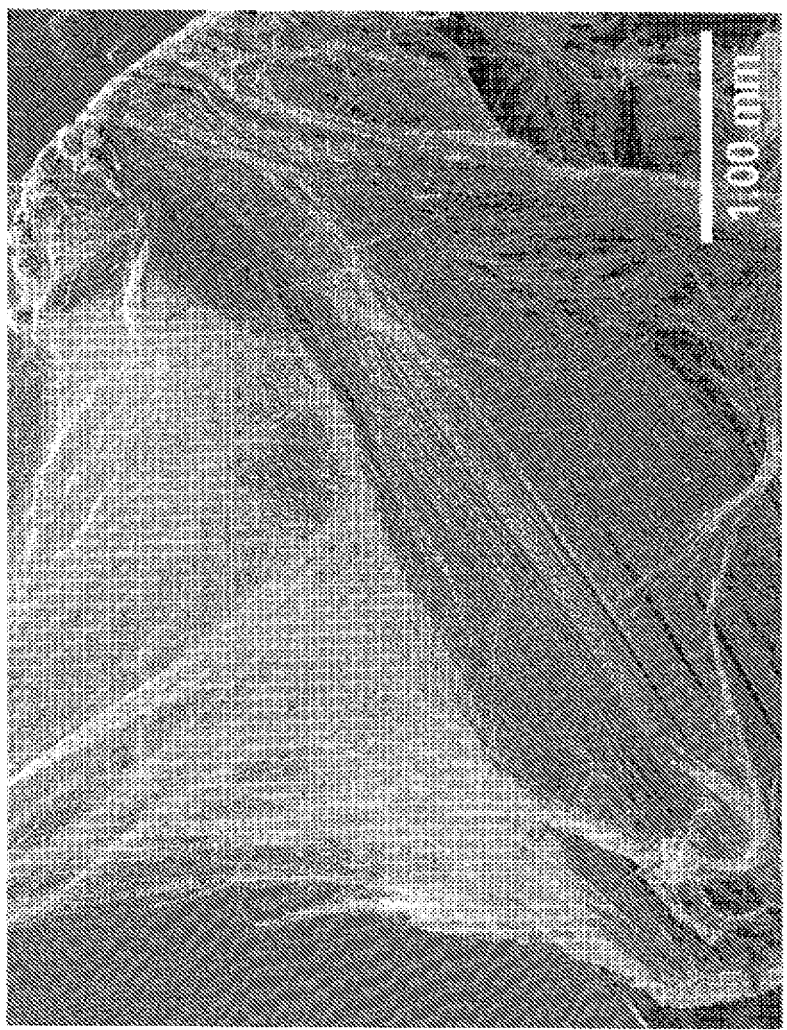
FIG. 1. SEM image of the raw carbon nanotube material as-received from Nanotech Labs.
Figure 2A:
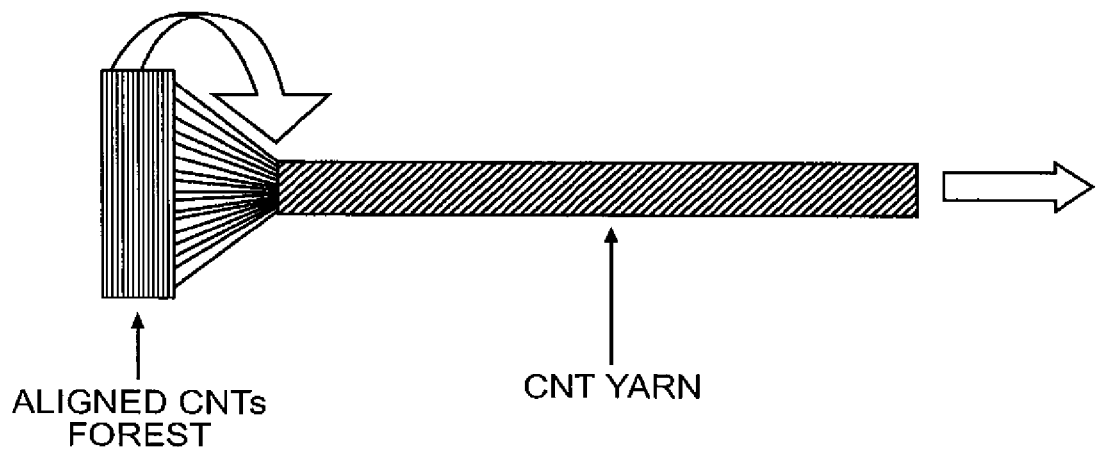
FIGS. 2(A) and 2(B) are schematic drawings showing generic methods for producing carbon nanotube yarn directly from aligned carbon nanotube forest. In particular.
Figure 2B:
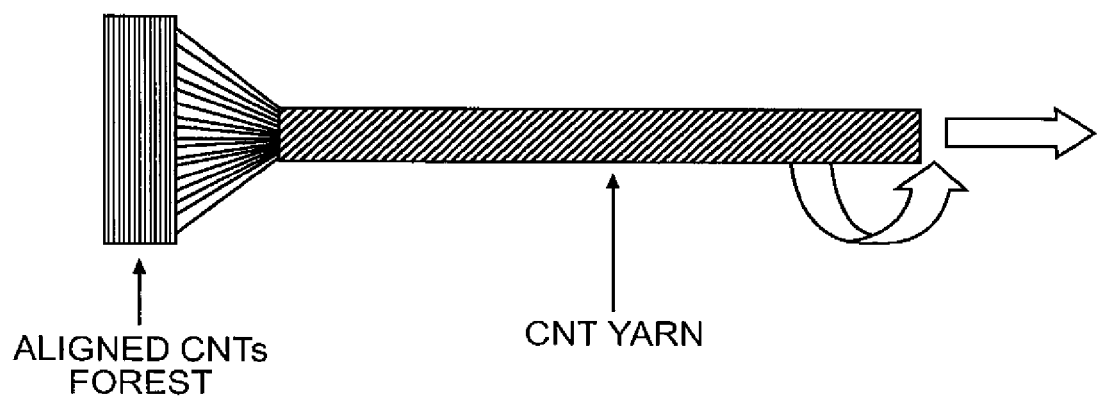
Figure 3A:
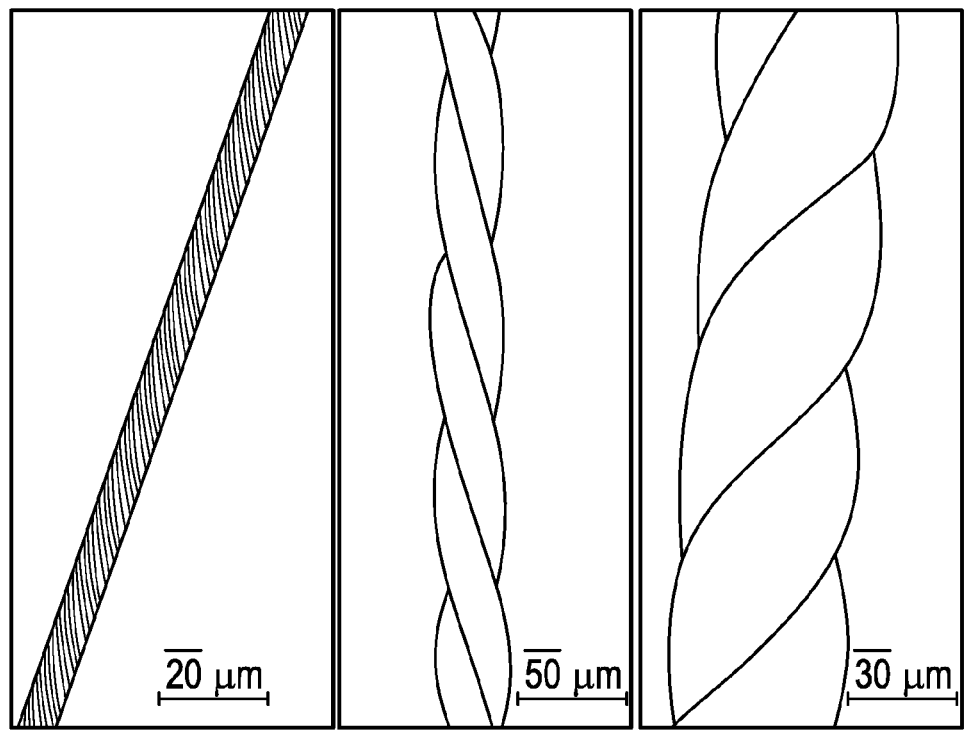
FIG. 3(A) shows a single ply (left), a double-ply (middle), quadruple-ply (right) thread made according the present invention.
Figure 3B:
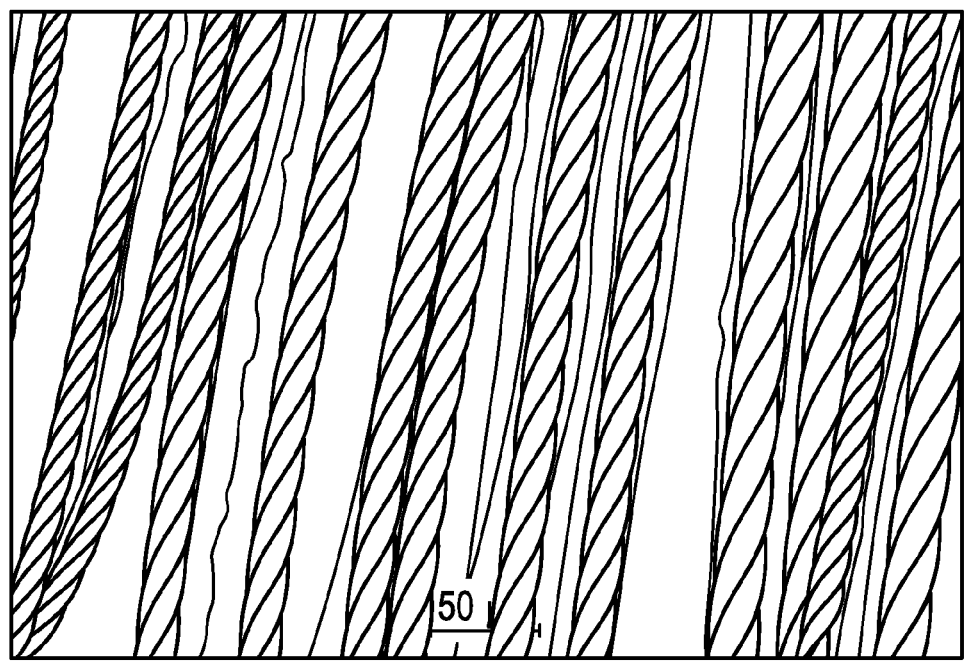
FIG. 3(B) shows a collection of single ply carbon nanotube thread containing chemically linked carbon nanotubes made according to the present invention.

The yarns shown in FIG. 3 were made by using the first method (shown in FIG. 2), which comprised spinning the carbon nanotube forest while the yarn was drawn. By using counter-spinning technique, the yarn (also called singly ply thread) could be spun into multiple-ply thread. SEM images of single, double and quadruple-ply threads are shown in FIG. 3. These threads were made from high quality carbon nanotubes and the individual carbon nanotube measures 3 to 5 mm in length. The yarn and thread shown in this disclosure incorporating the three new features: long carbon nanotubes, twisted and chemically linked together.

Example 2

Wet Spun Carbon Nanotube Yarns

The carbon nanotube yarns according to this example were produced by: a) impregnating carbon nanotube material with PEG-2000; b) removing the excess PEG from the carbon nanotube material to make carbon nanotube dough; c) sandwiching the resulting carbon nanotube dough between two layers of paper; d) producing thin film by repeatedly running roller over the carbon nanotube dough; e) slitting the carbon nanotube thin film into narrow ribbons; f) twisting the narrow ribbons into yarns; g) baking the resulting yarns at 220° C. for half an hour; h) carboxylation of the spool of yarn; i) heating at 500° C. for 30 mins to achieve cross-linking within the yarn.

Figure 4:
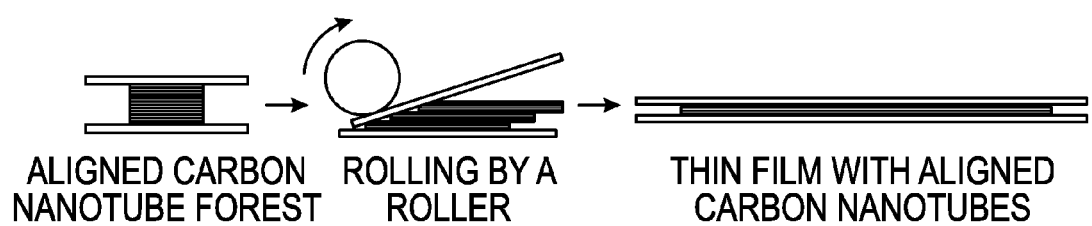
FIG. 4. A schematic drawing of the production of an aligned carbon nanotube thin film by rolling. Left: A piece of carbon nanotube forest impregnated with polyethylene glycol (PEG) is sandwiched between two layers of paper; middle: Rolling is used to press the carbon nanotube forest into a thin carbon nanotube film; Right: The resulting carbon nanotube thin film is sandwiched between two layers of paper. The paper was made from a mixture of glass fibers and bi-component polymer fibers.
Figure 5:
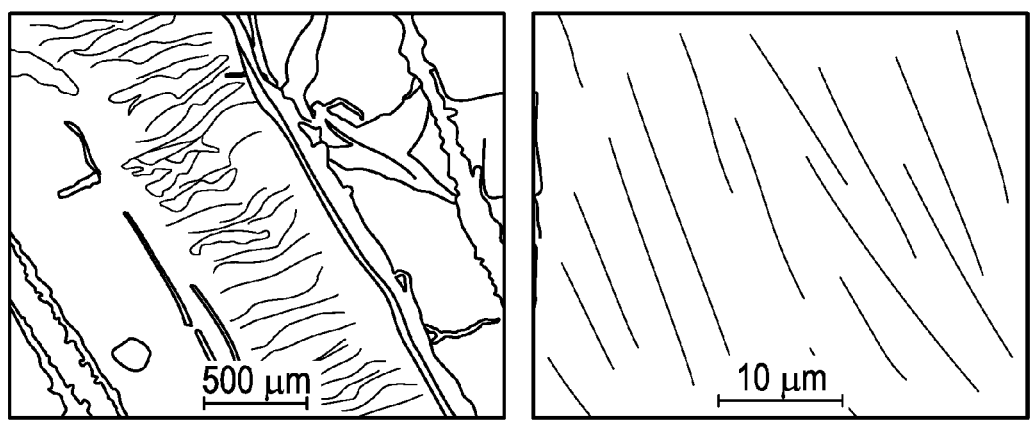
FIG. 5. illustrates a carbon nanotube thin film. Left: low magnification (50×). Right: high magnification (3000×).

The method for making carbon nanotube thin film is depicted in FIG. 4 and the SEM images of the resulted thin film are shown in FIG. 5. Low magnification SEM image of carbon nanotube ribbon shows a total width of the ribbon of about 1.5 mm. High magnification SEM image is showing carbon nanotubes alignment within the film.

Figure 6:
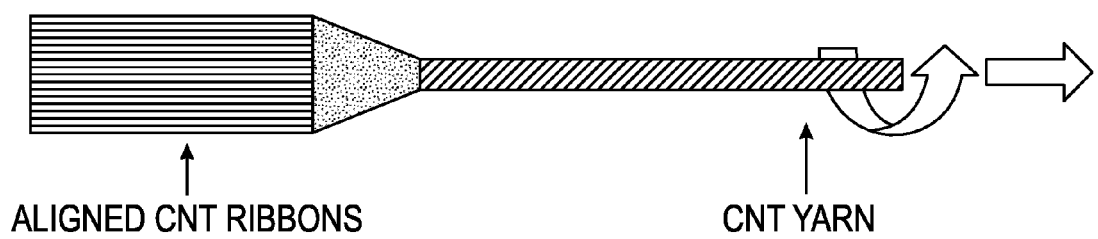
FIG. 6. A schematic showing carbon nanotube threads being produced from aligned carbon nanotube ribbons.
Figure 7:
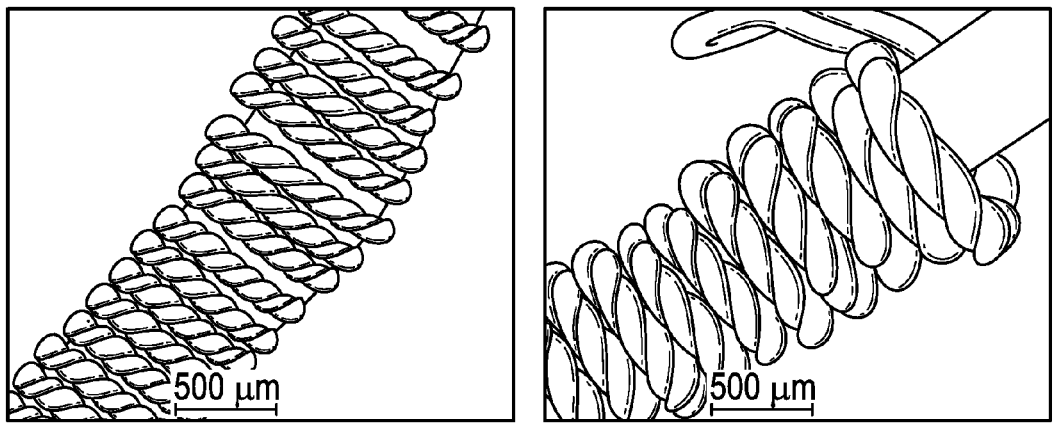
FIG. 7. illustrates two spools of carbon nanotube threads made from aligned carbon nanotube ribbons. Left: single ply thread, Right: a double ply thread.
Figure 8:
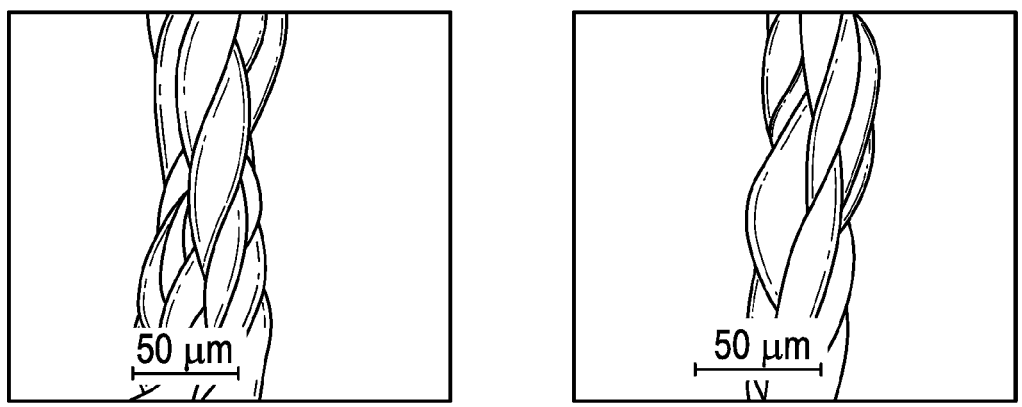
FIG. 8. illustrates two braided carbon nanotube materials.

The method for making carbon nanotube yarns from aligned carbon nanotube ribbons is depicted in FIG. 7. SEM images of two spools of carbon nanotube yarn and thread made from the above aligned carbon nanotube ribbons are shown in FIG. 8, These yarn and thread were made by twisting and pulling the aligned carbon nanotube ribbons and both a single ply and a double ply carbon nanotube yarn and thread were made from the thin film shown in FIG. 6.

Example 3

Braided Carbon Nanotube Materials

By using the techniques shown in example 1, some double ply threads were made. Using the conventional technique, under optical microscope, a piece of braided material was made by tweezers. Two SEM images of a braided carbon nanotube material are shown in FIG. 8 and three strands of double spun carbon nanotube yarns ere used in this braided material.

Example 4

Carbon Nanotube Fabric

Figure 9:
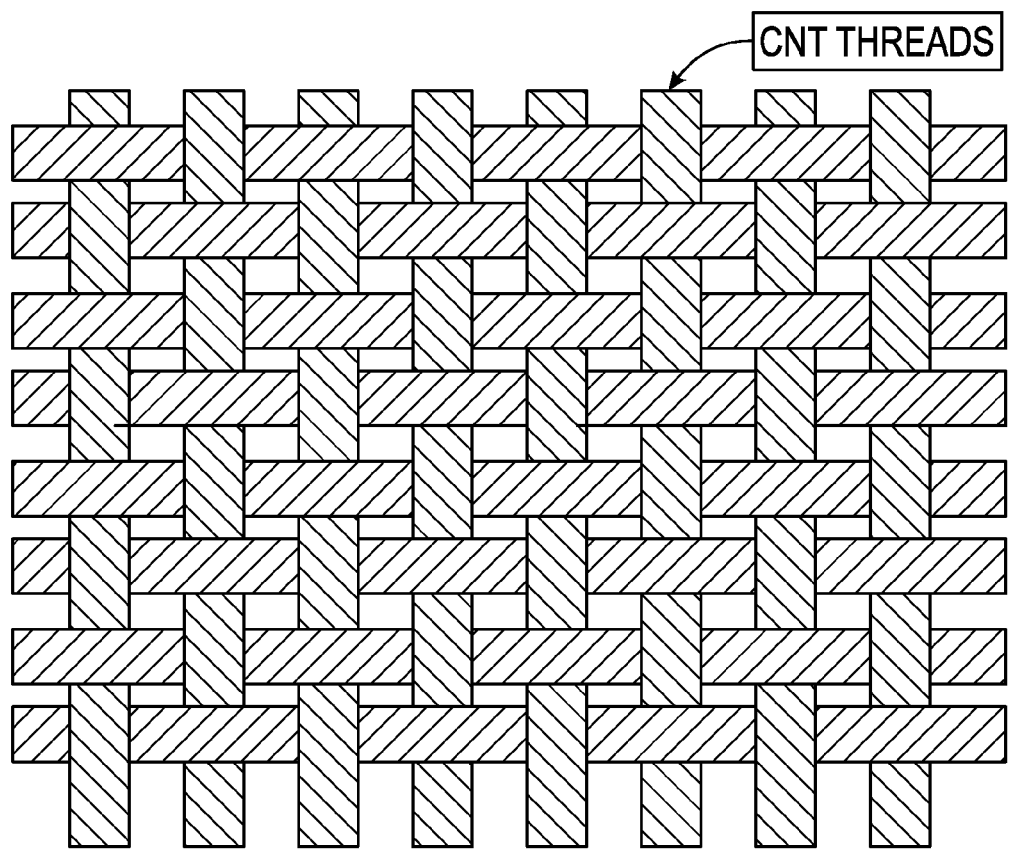
FIG. 9. A schematic drawing of a piece of carbon nanotube fabric.
Figure 12:
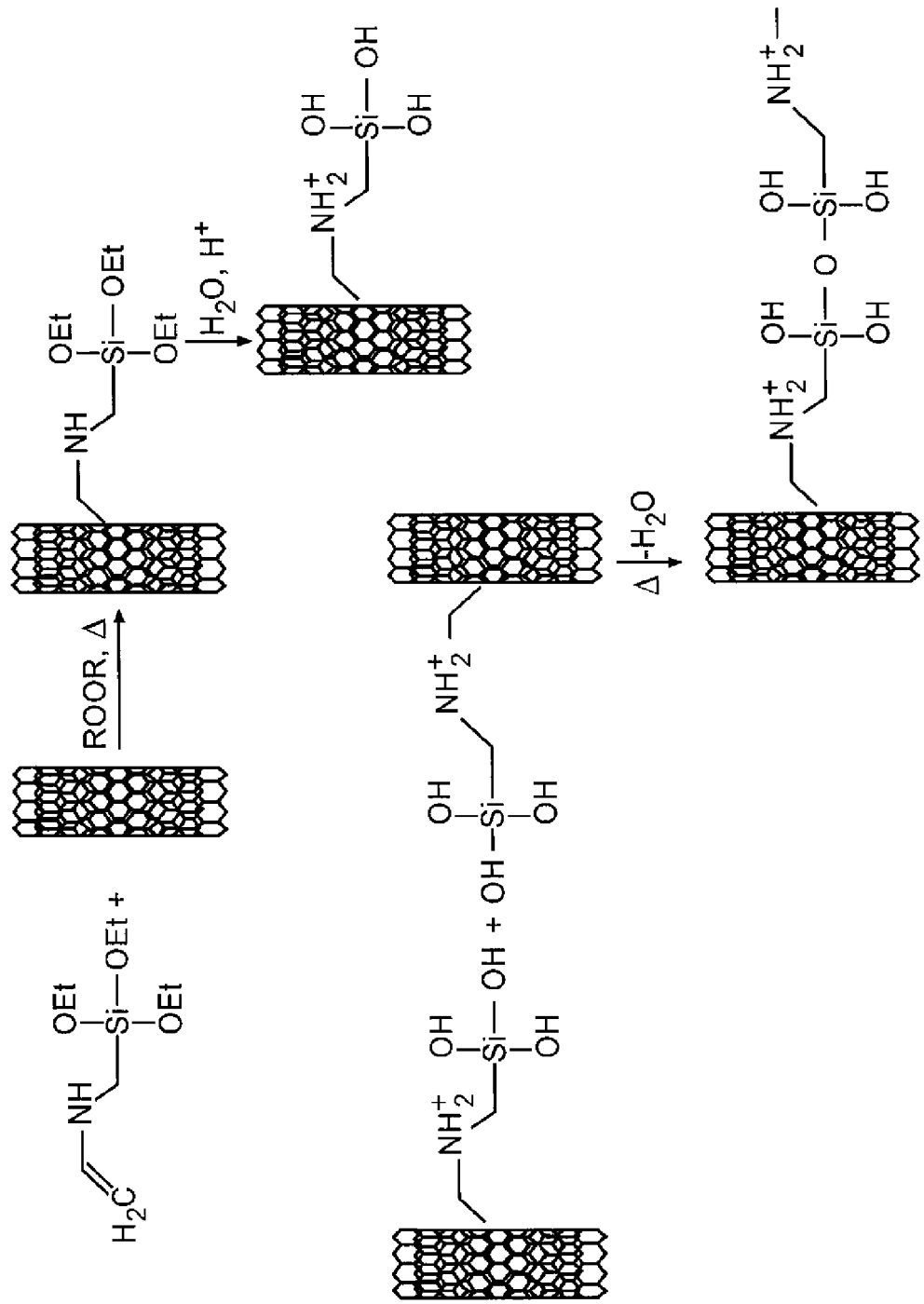
FIG. 12. Chemical reactions involved in the carbon nanotube cross-linking through functionalization with vinyl-triethoxyaminosilane.
Figure 13:
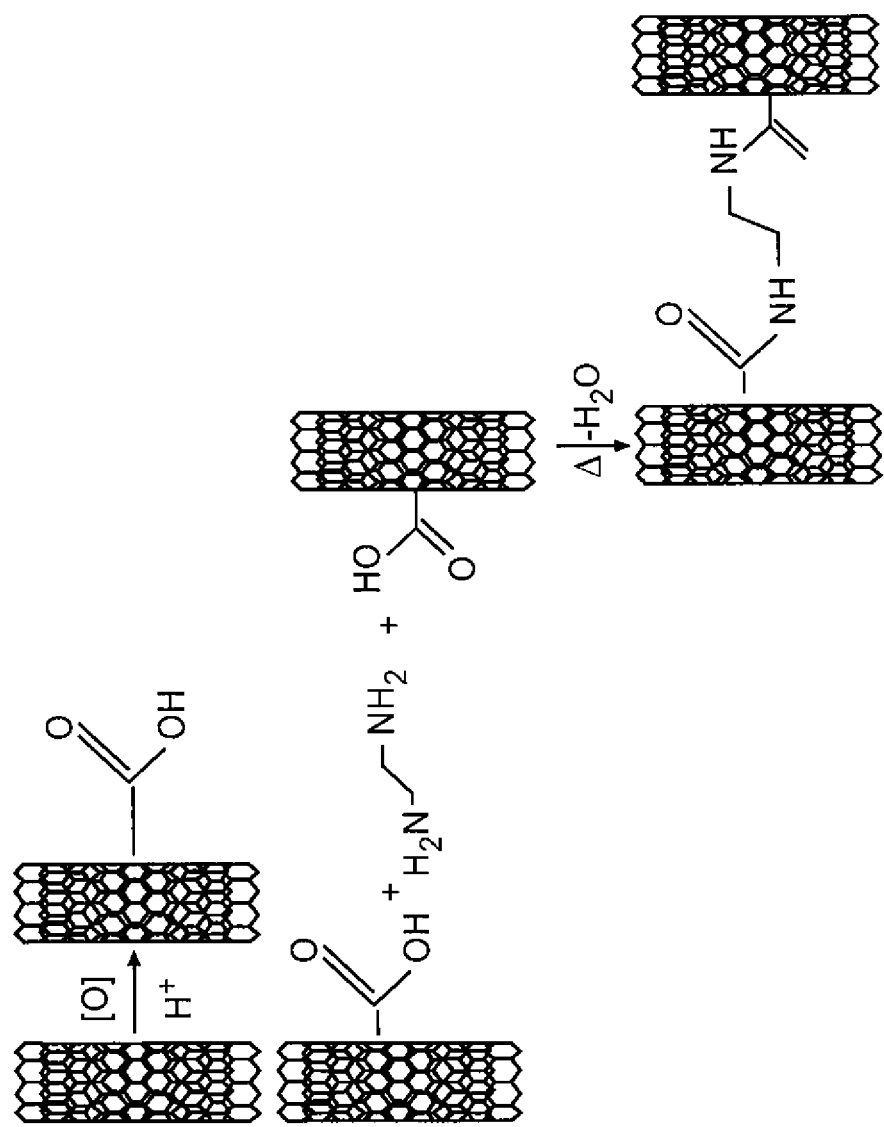
FIG. 13. Chemical reactions involved in the carbon nanotube functionalization with carboxyl groups followed by cross-linking with a diamine.

By using the techniques shown in example 1, some single ply and double ply threads were made. A schematic drawing of a piece of carbon nanotube fabric is shown in FIG. 9. Under optical microscope, a homemade loom was used for the weaving of the fabric. SEM images of the piece of woven fabric are shown in FIG. 10. The fabric was woven from a mixture of single and double spun carbon nanotube yarns. The diameter of the yarns is in the range of 20 to 50 urn.

Example 5

Chemical-Linking of Carbon Nanotubes

The experiments on cross-linking of carbon nanotubes were performed over carbon nanotube strips. The same process could be applied to the disclosed materials in this invention.

Long CNTs (3-5 mm in length) with diameters of 30-50 nm provided by NanoTechLab were used as received. The detail procedure of the experiments is described as:

I. Thermal Annealing
(1) Long CNTs were acid washed and dispersed.
(2) Suspension of carbon nanotubes were deposited onto carbon cloth substrate discs,
(3) Carbon nanotube membrane was peeled off the substrate, pressed with a hand roller and dried.
(4) Seven thin strips of roughly 0.25 mm thickness were slit from the central part of each membrane. These strips were called untreated.
(5) Four of the seven strips were annealed at 500° C. for half an hour.
These strips were called heat treated.
II. Chemical Treatment
(1) Vinyltrialkoxysilanes were attached to the long carbon nanotube sidewall via free radical reaction.
(2) Functionalized carbon nanotubes from step 1 were dispersed.
(3) Suspension of carbon nanotubes were deposited onto carbon cloth substrate discs.
(4) Carbon nanotube membrane was peeled off the substrate, pressed with a hand roller and dried.
(5) Carbon nanotube membrane was thermal processed at 120-150° C. to form siloxane —Si—O—Si— bridges between the outer shells of the adjacent nanotubes.

All 10 strips were tested with an MTS Insight Tensile Tester under uniaxial tensile loading and the stress-strain curves for each strip are shown in FIG. 15. The early mechanical behavior of both types of cross-linked strips is very similar (nearly equal slope) with the chemically linked strips being able to withstand higher applied stresses. Both types of treated strips were shown to consistently carry higher tensile loading before breaking and have a steeper stress-strain relationship, conclusively demonstrating an improvement in the mechanical behavior in tensile strength.

Example 6

A Feedback Control Conductive Nano-Fiber Yarn Production Machine

Figure 16:
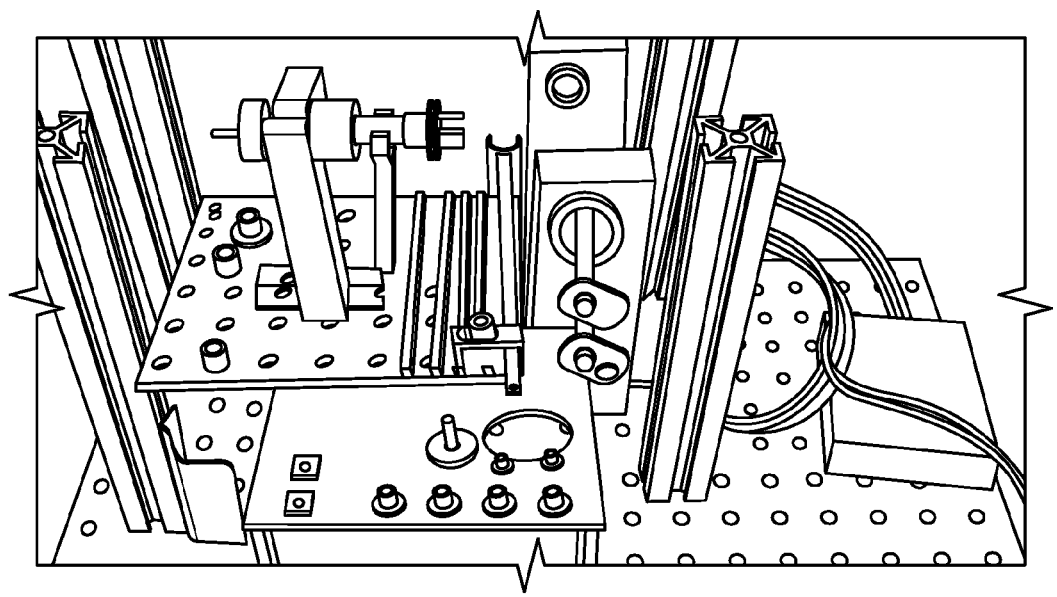
FIG. 16. Single ply yarn spinning machine with spindle and take up reel.
Figure 17:
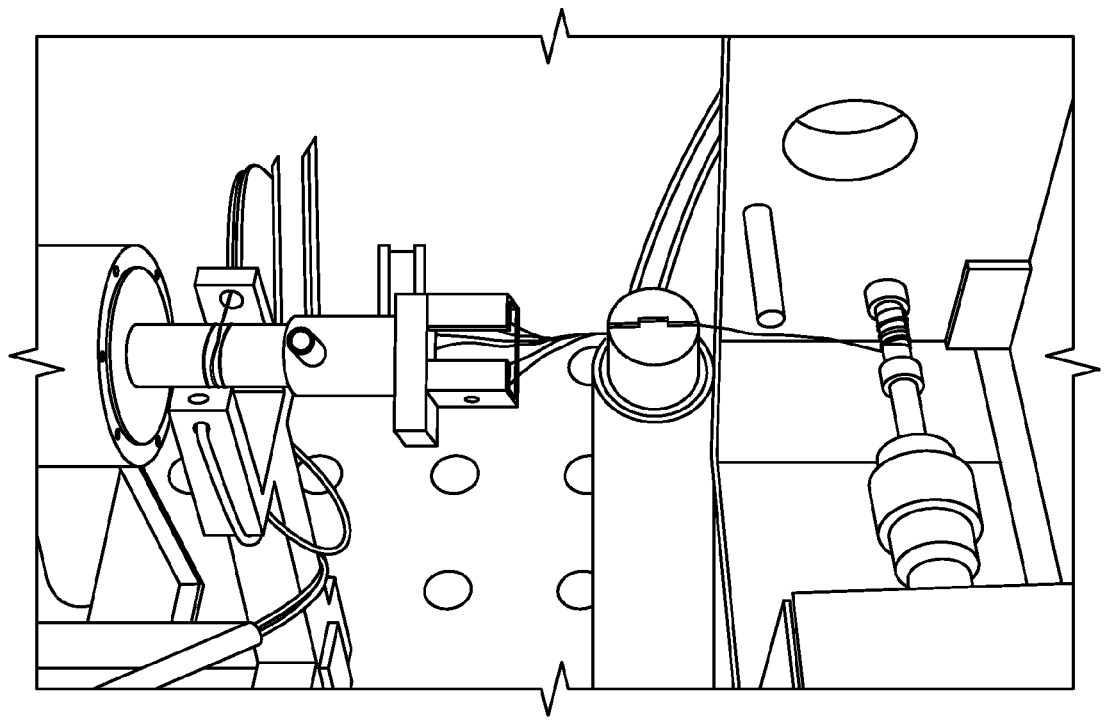
FIG. 17. Close up of spindle loaded with forest of carbon nanotubes and take-up spool.

A Single ply yarn spinning machine with spindle and take up raster and full feedback control was built, and is shown in FIGS. 16-23. As can be seen in FIG. 16 a mechanical layer is suspended over an electronics layer. This was done to minimize delay, capacitance and inductance in the control and power wires.

A motor mount was machined out of Plexiglas was fabricated to hold a 10,000 rpm motor. A conductive cylindrical element made of a copper graphite materials was used on the spindle for the contact of a slip ring. A miniature vice was fabricated to hold the carbon nanotube forest. This is also referred to herein as the forest holder. The forest was oriented to be approximately 90 degrees to the yarn feed direction. A conductive pedestal made of the same copper graphite material was fabricated to sit on top of a grounded aluminum cylinder as shown in FIG. 16. The miniature vice was made of aluminum and is conductive, thus transmitting feedback signal through the forest to the thread. Note the thread must pass through a channeled electrically grounded conductive block. The gap between the spindle head and the grounded channel is approximately 1 cm.

As the thickness of the thread changes due to inconsistencies within the carbon nanotube forest, the feedback signal will tell the controller to change spindle speed and take-up speed such that the thread will thin or thicken, Thus the controller will cause inconsistency in the forest to be mitigated.

A take up motor was used to spool the as spun yarn onto a miniature spool is also mounted to the mechanical layer. As seen is FIG. 16, this take up motor is the upper motor to the right of the spindle motor and mounted in an aluminum block. A motor and screw shaft was used to shuttle the raster tool back and forth so as to spool the thread on the spool with a consistent back and forth lay.

Below the mechanical layer an electronic layer was built. This consists of a wire wrap board with components mounted thereon. This electronics layer was built to receive signals from the National Instruments™ DAC shown in FIG. 16 to the right, and convert them to motor voltages. The electronics layer also receives the high impendence signal from the as spun yarn, (the segment between the spindle and the grounded channel block), filters and amplifies the signal to send to the National Instruments™ DAC. The control signal is then converted to digital form and becomes the DataStream input for the LabView™ software controller. Please refer to FIG. 23 for a view of the electronics layer.

Furthermore, hardware buttons and switches were installed to aid in the operation of the machine. Red buttons were installed for system start and stop. Switches were installed for forced motor run used for initial system threading. Other switches were installed for motor reversal for z twist and s twist control.

Figure 18:
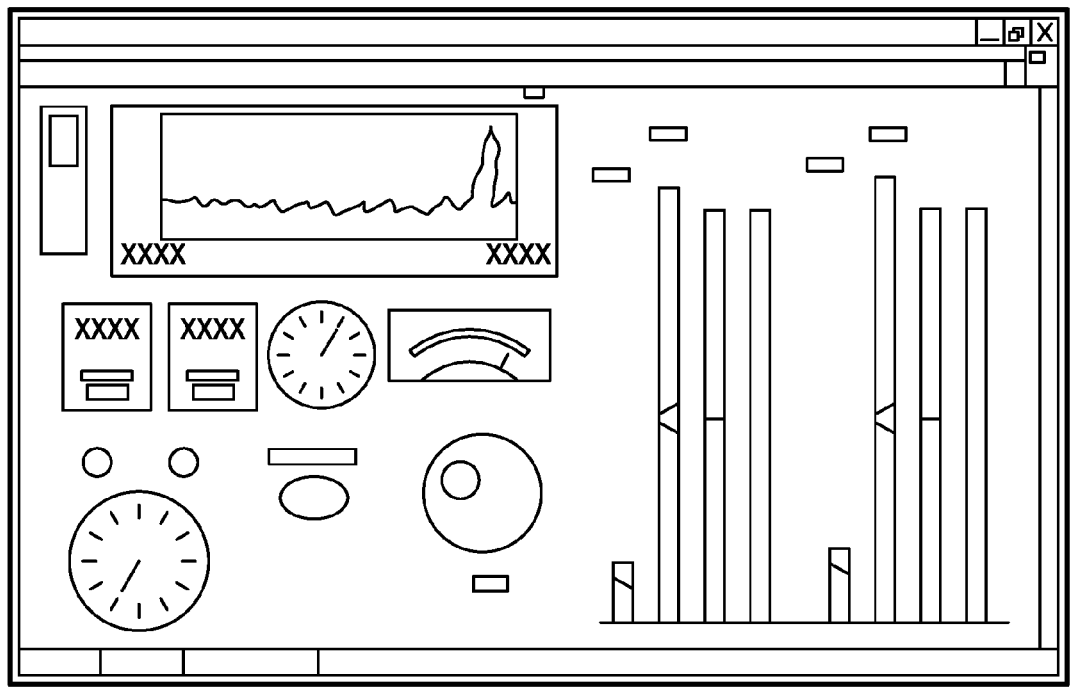
FIG. 18. illustrates a yarn spinning feedback controller panel with feedback control signal in the upper left-hand corner using LabView™.
Figure 19:
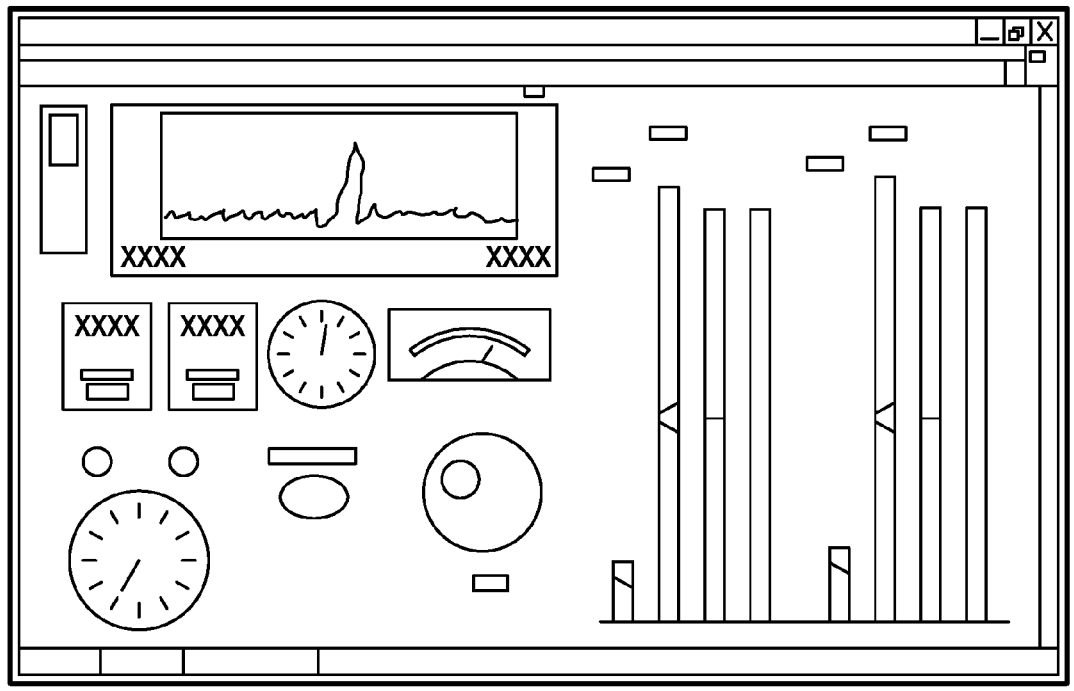
FIG. 19. Same as FIG. 18 approximately 10 sec later in time, thus demonstrating the real-time control over the spindle speed and the take up speed as a function of thread conductivity.
Figure 20:
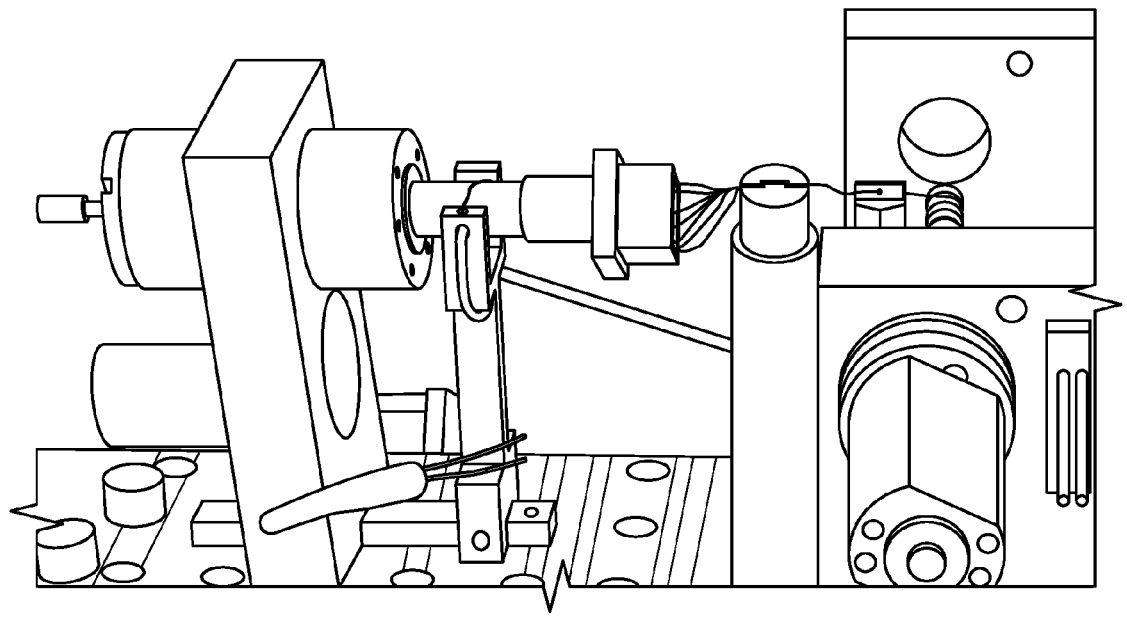
FIG. 20. View of spindle turning at about 7,000 RPM to produce an approximately 22 um diameter spun yarn with about a 30 degree twist angle with respect to the yarn axis, produced at a speed of about 5 ft/min. The as spun yarn is rastered onto the take up spool to substantially reduce uncontrolled wrap to wrap yarn entanglement on the spool.
Figure 21:
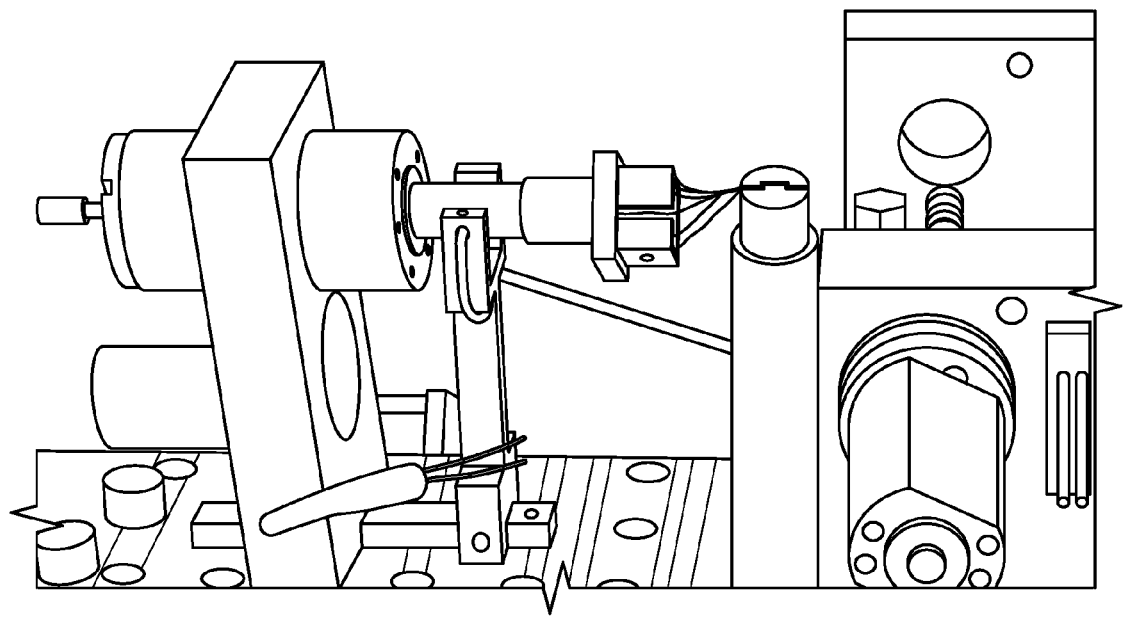
FIG. 21. Same view as FIG. 20 except the process is at a standstill to show the slip ring to spindle shaft. The forest holder is conductive thus transmitting feedback signal through the forest to the thread. Note the thread must pass through a channeled electrically grounded conductive block. The gap between the spindle head and the grounded channel is approximately 1 cm. As the thickness of the thread changes due to inconsistencies within the carbon nanotube forest the feedback signal will tell the controller to change spindle speed and take-up speed such that the thread will become thinner or thicker. Thus the controller will cause inconsistency in the forest to be mitigated.
Figure 22:
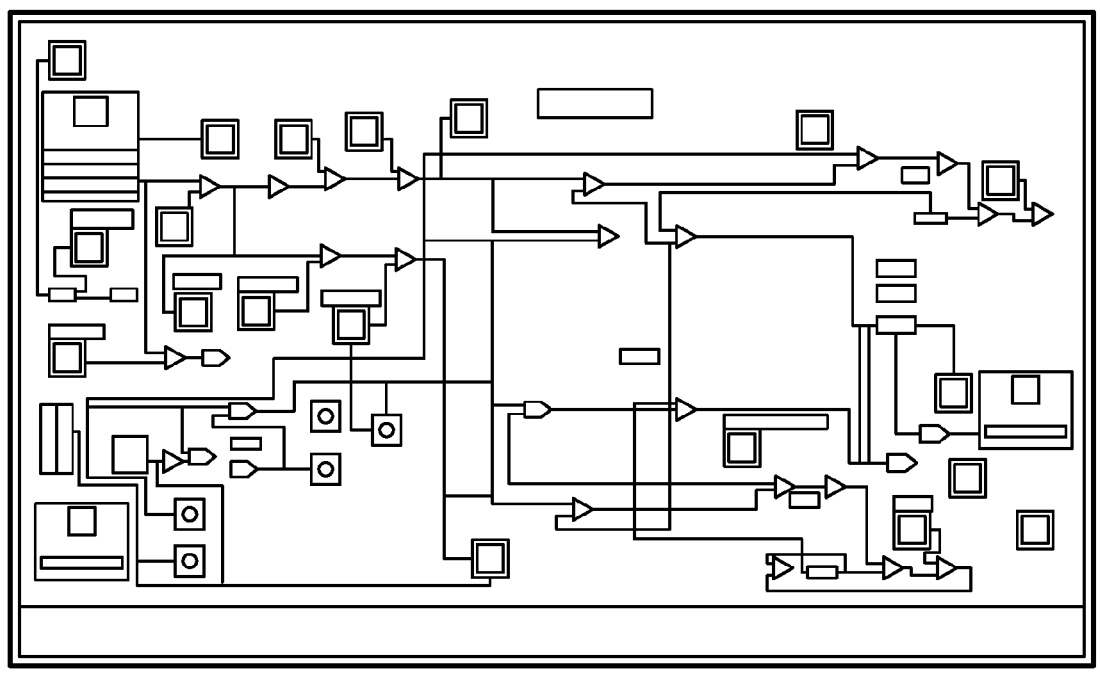
FIG. 22. is a view of the feedback control program written in LabView™ by National Instruments™.
Figure 23:
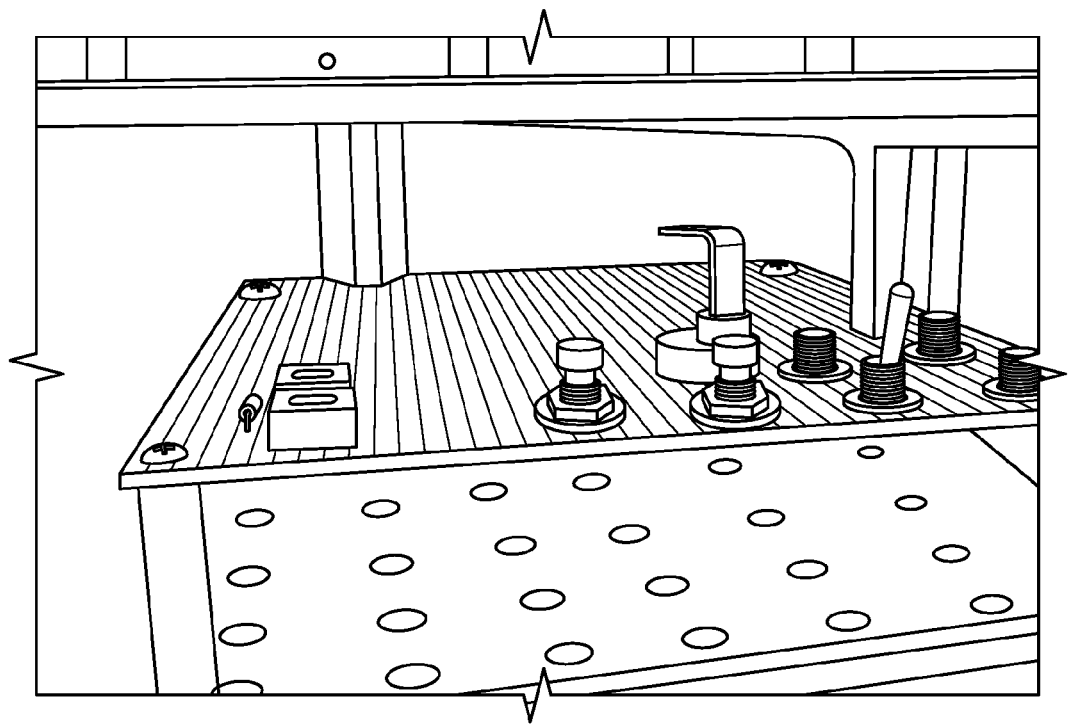
FIG. 23. is a view of the thread signal amplification electronics and power transistor for motor control. This "electronics layer" sits between a National Instruments data acquisition unit and the mechanical layer. The red buttons are system start and stop. The switches are forced motor run that aide in initial system threading.

The software control panel layer was engineered so the user has control over the responsiveness of the motors to the control signal through a gain control and a bios control slider to the right hand side of FIG. 18. Furthermore the nominal yarn thickness can be substantially controlled by the X-bar controller. Close up of spindle loaded with forest of nanofibers and take-up spool, Please refer to FIGS. 18, 19, & 22 for a view of the software layer.

Example 7

Carbon Nanotube Yarn Produced with Said Yarn Production Machine

A carbon nanotube yarn was produced with the yarn production machine of example 6. Approximately 3 mm long carbon nanotubes in as grown forest form from Nano-TechLabs was fitted into the forest holder.

Sharp tweezers were then used to start the yarn. The operator forced the spindle to turn while drawing the first segment of yarn. This yarn was guided through copper graphite channels, through a copper graphite shuttle and wrapped. The operator watched the feedback signal on the computer screen (FIG. 18) to see that the thread was stable and consistent at yarn was drawn from the spinning spindle.

The spindle and take up gain and bias were set to values seen if FIG. 18. The thickness of yarn was also set at a relative value of X-bar at 3.5 as can in FIG. 18.

The machine was started and almost immediately spun a substantially pure carbon nanotube yarn. The feedback signal was photographed and can be seen in FIGS. 18 and 19.

Figure 24:
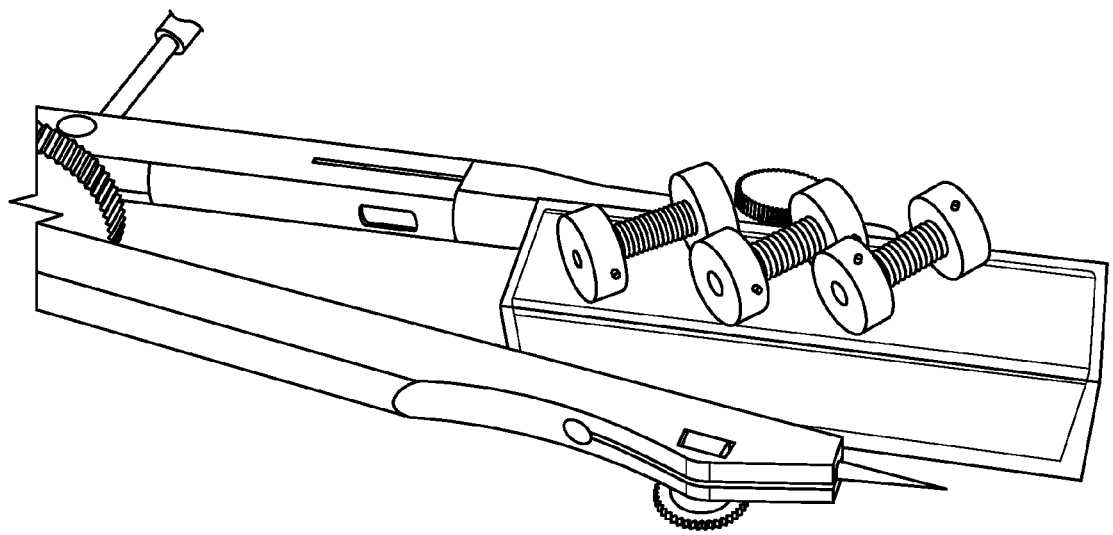
FIG. 24. Three spools of single ply carbon nanotube yarn.

A substantially consistent carbon nanotube yarn was spun. The spindle turned at a nominal speed of 7,000 RPM to produce an approximately 22 µm diameter spun yarn with a nominal 30 degree twist angle with respect to the yarn axis. The yarn was produced at a speed of nominally 5 ft/min. Note spindle speed and take-up speeds are always changing and that is determined by the conductivity of the thread segment between the spindle and the grounded channel. The as spun yarn is rastered on to the take up spool to substantially reduce uncontrolled wrap to wrap yarn entanglement on the spool. As an example of carbon nanotube yarn make in this way please see FIG. 24.

Example 8

Nano-Fiber Yarn to Thread, Thread to Cable Cabling Machine

Figure 26:
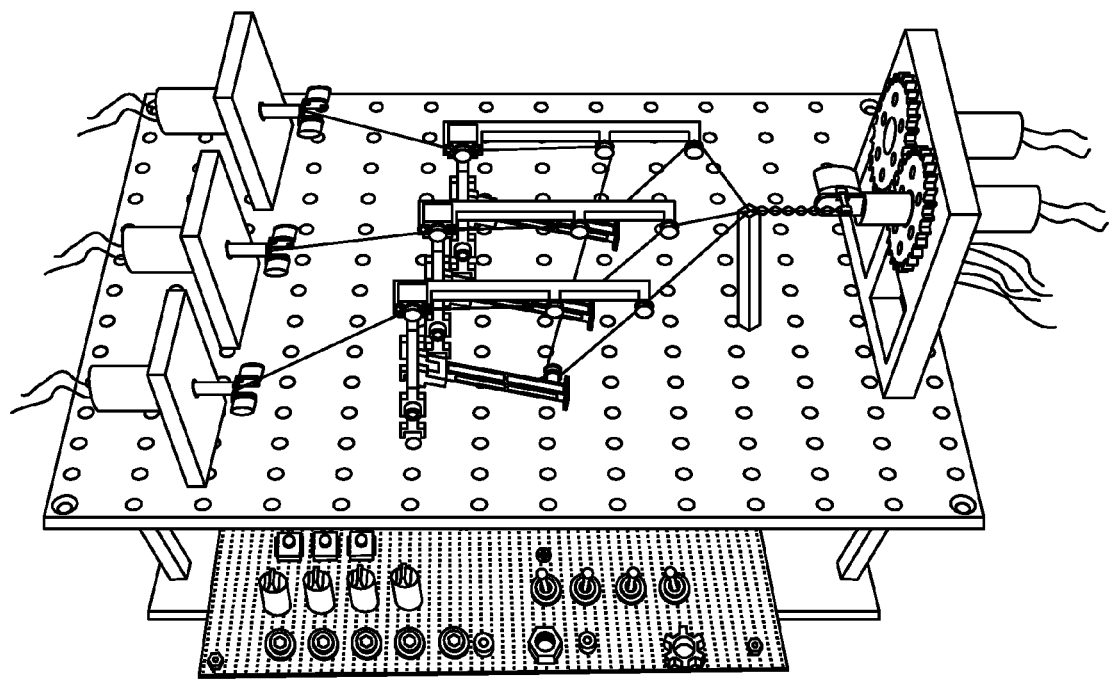
FIG. 26. This is a three to one nano-fiber yarn cabling machine with tension feedback control. The system uses a total 8 encoded motors with gear reduction.

This example describes a nano-fiber yarn to thread, thread to cable cabling machine that was built and shown in FIG. 26. For an excessively delicate material nano-fiber yarn to be properly and substantially tensioned, spun and cabled a tension feedback control is required. The system used a total 8 encoded motors with gear reduction for spinning and spooling. As can be seen in FIG. 26, three feedback tension devices were conceived designed built tested and used to substantially and precisely control tension on each yarn, line during cabling.

Figure 27:
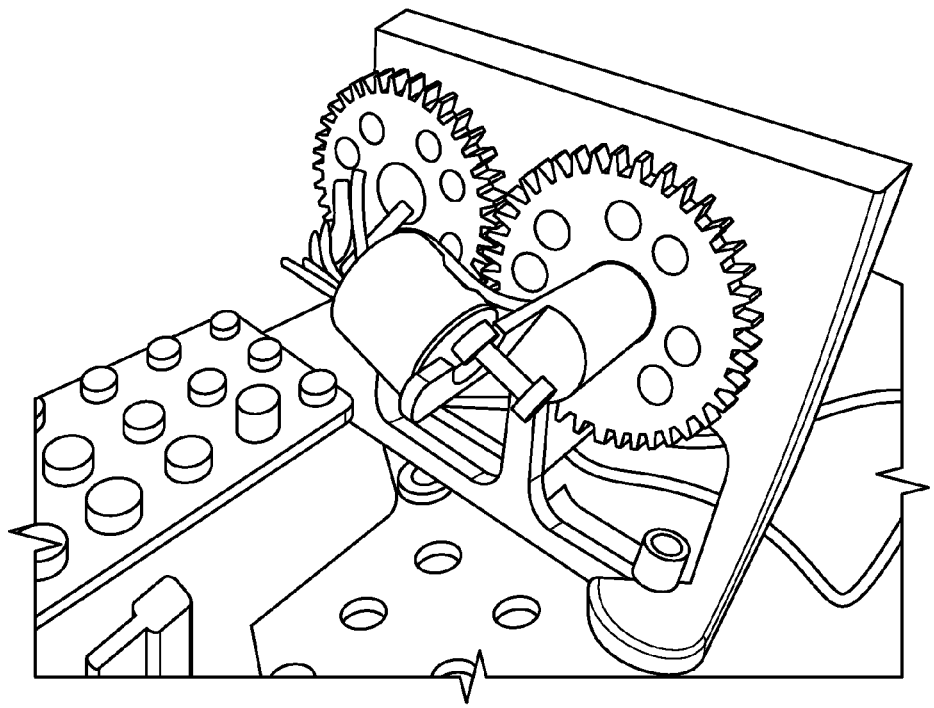
FIG. 27. This is the driven cable take-up. The small motor spools the cabled yarn while another larger motor, mounted to the aluminum frame twists the ply's into one cable. A multi-conductor commercial slip ring was used to power and control the micro-motor mounted to the spinning shaft. At the lower left-hand corner of this image is a three dimensional yarn to cable guide made from a copper graphite composite.

A driven cable take-up was designed and built as can be seen in FIG. 27. The small motor spools the cabled yarn while another larger motor, mounted to the aluminum frame twists the ply's into one cable. A multi-conductor commercial slip ring was used to power and control the micro-motor mounted to the spinning shaft. At the lower left-hand corner of this image is a three dimensional yarn to cable guide made from a copper graphite composite.

Figure 28:
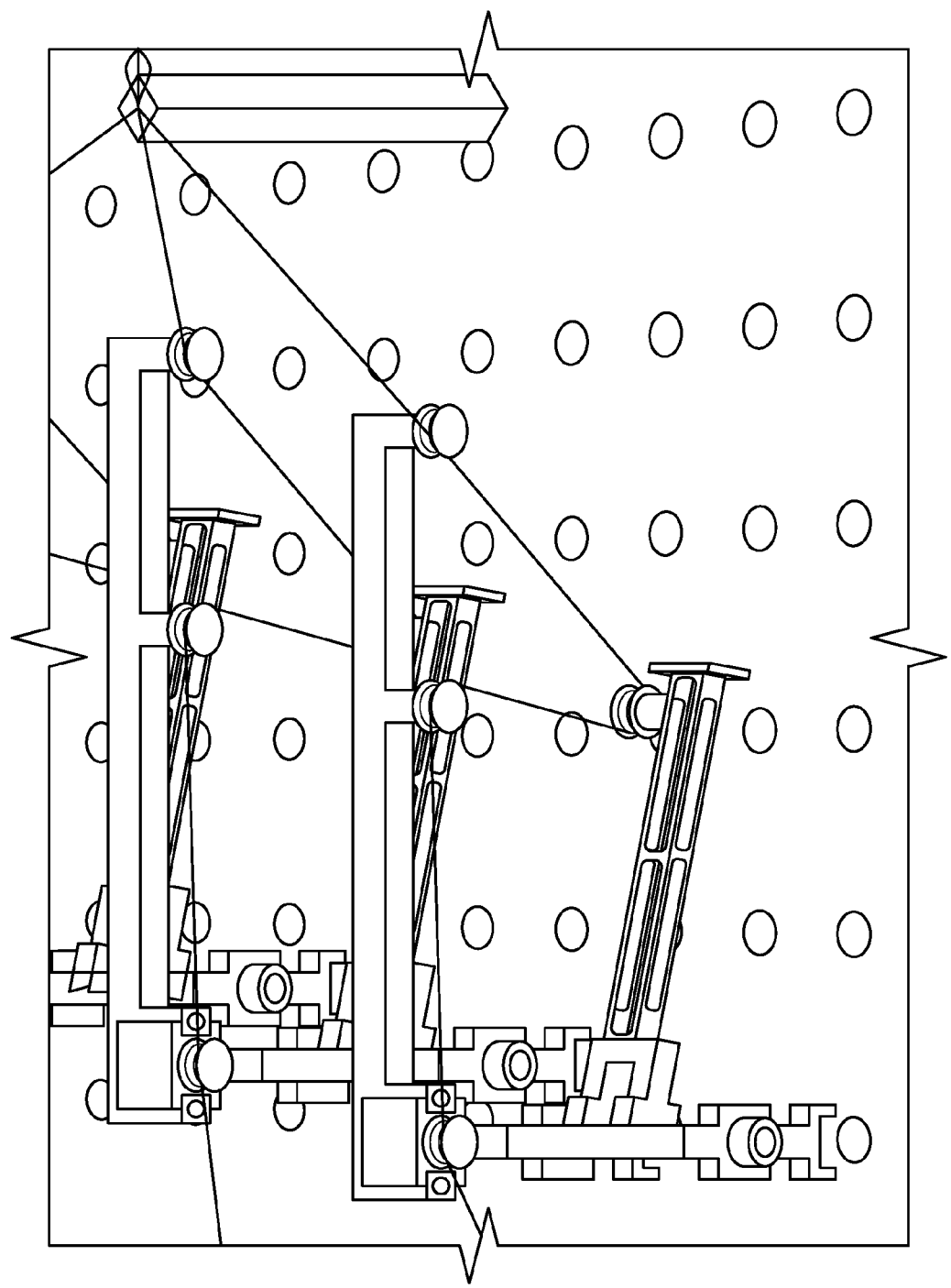
FIG. 28. Shows the spool out assembly mounted in a Plexiglas pedestal. The spool out device can be seen as a set of gears to both spool and twist the yarn. Also present in this Figure are the three feedback tension devices. Each device has an optical path through the center of the armature joint. An LED in mounted on one side and a sensor on the other. Between the LED and the sensor is a set of polarized filters. One filter is mount stationary in the optical path, the other is mounted to the armature. As the armature moves the amount of light the sensor receives changes. In this way the controller will spool out yarn on an as needed basis. The each tension arm also delivers a substantially uniform tension to each of the three yarns. The same system can be used to cable three multiply thread into a cable. Furthermore same system can be used to cable three cables into a larger cable.

Spool out device were conceived designed and fabricated to both spool and twist the yarn. A gears train was built to deliver a multi axis rotation to the microspools shown in FIG. 28. The spool out assembly was mounted in a Plexiglas pedestal.

Furthermore the three feedback tension devices was built to have an optical path through the center of the armature joint. An LED in mounted on one side and a sensor on the other. Between the LED and the sensor is a set of polarized filters. One filter is mount stationary in the optical path, the other is mounted to the armature. As the armature moves the amount of light the sensor receives changes. In this way the controller will spool out yarn on an as needed basis. The each tension arm also delivers a substantially uniform tension to each of the three yarns. The same system was used to cable three multiple threads into a cable. Furthermore, the same system was used to cable three cables into a larger cable. Each tension arm can be mounted with un upper limit of approximately 3 kg to deliver substantial pressure between the cabled elements.

An electronics layer was designed and built to sit between the National Instruments data acquisition device and the mechanical layer as can be seen in FIG. 31. Every motor required a power transistor to amplify the control signal coming back from the computer to power the motors as can be seen on the upper left-hand side of this Figure. Furthermore capacitors were used to substantially reduce noise from the motors so as to not adversely affect the circuit.

The controller program was conceived, programmed and a dash board layout was built as can be seen in FIG. 29. From this dash board cabling parameters can be controlled. Furthermore the controller program in National Instruments LabView visual programming language for the cabling machine is presented in FIG. 30.

Example 9

Cable Comprising 135 Ply

Figure 25:
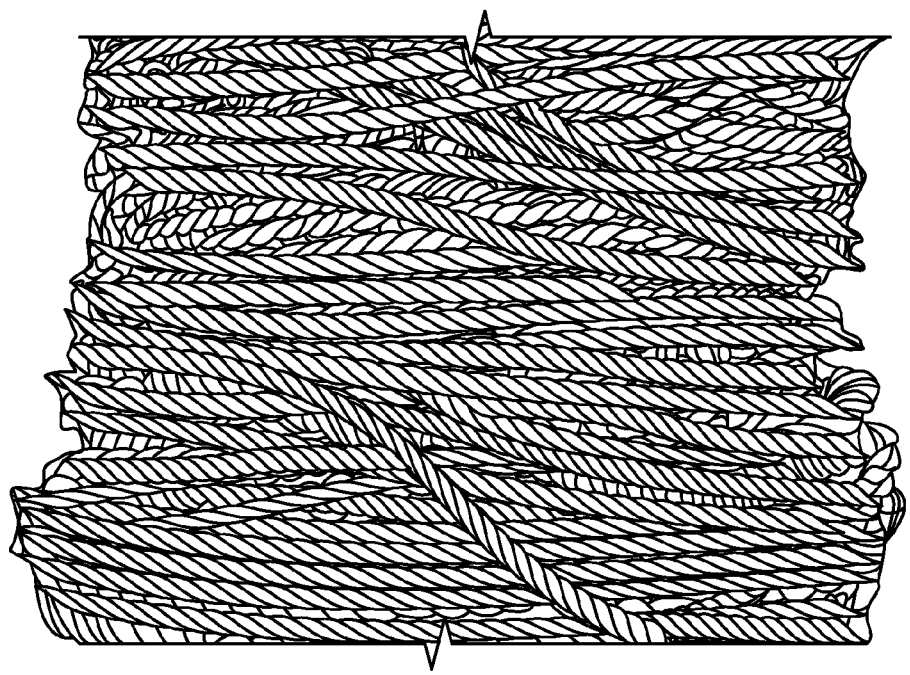
FIG. 25. One spool containing two samples a) a 45 ply cable of carbon nanotube yarns b) a 135 ply cable of carbon nanotube yarns.

A carbon nanotube cable of cables was fabricated using the cabling machine of example 8. The process was started with 9 spools five ply thread each approximately 20 ft long. The five ply cables turned into 3 spools of 45 ply cable approximately 15 ft long. There was fiber loss at the ends of the spools and some was saved for imaging and analysis. The three spools of 45 ply cable were turned into one spool of 135 ply cable approximately 10 ft long Please see FIG. 25 for an SEM of both the 45 ply cable and the 135 ply cable.

As used herein, the terms "a", "an", and "the" are intended to encompass the plural as well as the singular. In other words, for ease of reference only, the terms "a" or "an" or "the" may be used herein, such as "a support", "an assembly", "the fiber", etc., but are intended, unless explicitly indicated to the contrary, to mean "at least one," such as "at least one support", "at least one assembly", "the at least one fiber", etc. This is true even if the term "at least one" is used in one instance, and "a" or "an" or "the" is used in another instance, e.g. in the same paragraph or section. Furthermore, as used herein, the phrase "at least one" means one or more, and thus includes individual components as well as mixtures/combinations.

The term "comprising" (and its grammatical variations) as used herein is used in the inclusive sense of "having" or "including," with which it may be used interchangeably. These terms are not to be construed as being used in the exclusive sense of "consisting only of" unless explicitly so stated.

Other than where expressly indicated, all numbers expressing quantities of ingredients and/or reaction conditions are to be understood as being modified in all instances by the term "about." This includes terms such as "all" or "none" and variants thereof. As used herein, the modifier "about" means within the limits that one of skill in the art would expect with regard to the particular quantity defined; this may be, for example, in various embodiments, ±10% of the indicated number, ±5% of the indicated number, ±2% of the indicated number, ±1% of the indicated number, ±0.5% of the indicated number, or ±0.1% of the indicated number.

Additionally, where ranges are given, it is understood that the endpoints of the range define additional embodiments, and that subranges including those not expressly recited are also intended to include additional embodiments.

As used herein, "formed from," "generated by," and variations thereof, mean obtained from chemical reaction of, wherein "chemical reaction," includes spontaneous chemical reactions and induced chemical reactions. As used herein, the phrases "formed from" and "generated by" are open ended and do not limit the components of the composition to those listed.

The compositions and methods according to the present disclosure can comprise, consist of, or consist essentially of the elements and limitations described herein, as well as any additional or optional ingredients, components, or limitations described herein or otherwise known in the art.

It should be understood that, unless explicitly stated otherwise, the steps of various methods described herein may be performed in any order, and not all steps must be performed, yet the methods are still intended to be within the scope of the disclosure.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for the fabrication of a spun yarn, the method comprising:
    spinning a spindle containing synthetic inorganic nano-fibers from a bulk material;
    spinning a take-up spindle to collect spun yarn, wherein the spindle containing the synthetic inorganic nano-fibers is spinning relative to the take-up spindle at a relative angular velocity ranging from 30 rpm to 500,000 rpm, wherein the relative angular velocity is in an axial direction of the spun yarn, wherein the synthetic inorganic nano-fibers are substantially aligned with each other prior to spinning, wherein within the spun yarn a majority of the synthetic inorganic nano-fibers:
    (a) are longer than 300 μm, (b) have a diameter ranging from 0.25 nm and 700 nm, and (c) are substantially crystalline; and
    measuring a feedback signal in real time to control the spinning of the spindle containing the synthetic inorganic nano-fibers and the spinning of the take-up spinal to collect spun yarn.

2. The method of claim 1, further comprising attaching at least one molecular component to the synthetic inorganic nano-fibers, the at least one molecular component selected from the group consisting of metallic clusters, carbon nano-tubes, metallic coatings, organic functional groups, proteins, peptides, graphene, DNA, and polymers.

3. The method of claim 2, wherein the attaching comprises exposing the synthetic inorganic nano-fibers to a process selected from the group consisting of physical vapor deposition, chemical vapor deposition, solution phase adsorption, supercritical $CO_2$, plasma deposition, and ion implantation.

4. The method of claim 1, wherein the measuring a feedback signal comprises measuring a component selected from the group consisting of feedback control of spindle speed, yarn take-up speed, applied capacitive forces, applied magnetic forces, atmospheric conditions, concentration of spinning agent, sliver thickness, shyer alignment, sliver density, spindle fiber federate, roving, dispersion, and carding, and wherein the feedback signal includes automated measurements selected from the group consisting of conductivity, resistance, capacitance, inductance, optical, tension, vibrational frequencies, gamma-ray backscatter, and x-ray backscatter.

5. The method of claim 2, wherein the at least one molecular component is applied to the synthetic inorganic nano-fibers with feedback control of the application parameters selected from the group consisting of voltage, temperature, pressure, concentration, composition, frequency, and current, and wherein measuring a feedback signal includes automated measurements selected from the group consisting of chemical affinity, conductivity, resistance, capacitance, inductance, optical, tension, vibrational frequencies, gamma-ray backscatter, and x-ray backscatter.

6. The method of claim 1, further comprising cabling at least one said yarn with at least another said yarn by:
    spooling and spin tightening to form a spun and tightened yarn;
    contacting the spun and tightened yarn with a tension controller;
    contacting the spun and tightened yarn with another spun and tightened yarn to form a cabled yarn; and
    taking up the cabled yarn.

7. The method of claim 1, further comprising applying at least one sizing agent to said yarn, the sizing agent selected from the group consisting of poly-aromatic-hydrocarbons, nanoscale graphene structures, starches, polyvinyl alcohols carboxymethylcellulose, acrylates, waxes, dioctyl phthalate, surfactants, alcohols, and oils.

8. The method of claim 1, wherein the synthetic inorganic nano-fibers are comprised of carbon, metal, oxides, carbides or alloys or combinations thereof.

9. The method of claim 1, wherein said yarn has more than one species of synthetic inorganic nano-fibers that are substantially hollow, substantially solid, or filled with a secondary material.

10. The method of claim 1, wherein the synthetic inorganic nano-fibers are chosen from meta-materials, magnetic materials, semi-conducting materials, conductive materials, doped materials, super-conductive materials, adsorptive materials, insulation materials, or any combination thereof.

11. The method of claim 1, further comprising infiltrating said yarn with a polymer.

12. The method of claim 1, wherein the yarn comprises a long axis, and the synthetic inorganic nano-fibers within the spun yarn are substantially aligned and twisted about said long axis.

13. The method of claim 1, further comprising twisting together two or more spun yarns to form a twisted pair.

14. The method of claim 13, wherein said twisted pair is twisted while under a tension resulting in a pressure between the twisted pair ranging from 1 mPa and 30 TPa.

15. The method of claim 14, wherein said tension is translated into an internal pressure with force vectors pointed inward to the global axis of the twisted pair to enhance the integrity of the twisted pair.

16. The method of claim 13, further comprising twisting the twisted pair with at least one other said twisted pair to form a cable.

17. The method of claim 16, wherein the cable has a strength of ranging from 10 kPa to 300 GPa.

* * * * *